(12) United States Patent
Seagle et al.

(10) Patent No.: US 12,094,496 B1
(45) Date of Patent: *Sep. 17, 2024

(54) DUAL CIRCUIT ISOLATION OF WRITER TO READER CROSSTALK FOR SGV MODULES

(71) Applicant: Western Digital Technologies, Inc., San Jose, CA (US)

(72) Inventors: David J. Seagle, Morgan Hill, CA (US); Robert G. Biskeborn, Hollister, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/227,510

(22) Filed: Jul. 28, 2023

Related U.S. Application Data

(60) Provisional application No. 63/452,533, filed on Mar. 16, 2023.

(51) Int. Cl.
| | |
|---|---|
| *G11B 5/11* | (2006.01) |
| *G11B 5/02* | (2006.01) |
| *G11B 5/39* | (2006.01) |
| *G11B 5/73* | (2006.01) |

(52) U.S. Cl.
CPC .................. *G11B 5/11* (2013.01); *G11B 5/02* (2013.01); *G11B 5/3967* (2013.01); *G11B 5/739* (2019.05)

(58) Field of Classification Search
None
See application file for complete search history.

(56) References Cited

U.S. PATENT DOCUMENTS

| | | |
|---|---|---|
| 4,044,392 A | 8/1977 | Brock et al. |
| 7,031,089 B2 | 4/2006 | Hansen et al. |
| 8,004,799 B2 | 8/2011 | Biskeborn et al. |
| 8,804,262 B1 | 8/2014 | Partee et al. |

(Continued)

FOREIGN PATENT DOCUMENTS

EP 0044986 A1 2/1982

OTHER PUBLICATIONS

"Tape Drive Frequency Timing Generator", Silicon Labs, pp. 1-6, <https://www.mouser.com/datasheet/2/368/W173-311887.pdf>.

*Primary Examiner* — Fred Tzeng
(74) *Attorney, Agent, or Firm* — PATTERSON + SHERIDAN, LLP

(57) ABSTRACT

The present disclosure generally relates to a tape head and a tape head drive including a tape head. The tape head comprises at least one same gap verify (SGV) module comprising a plurality of write transducer and read transducer pairs. Each write transducer is coupled to writer bonding pads via writer leads, and each read transducer is coupled to reading bonding pads via reader leads. An isolation shield is disposed between the write transducer and read transducer such that the isolation shield is disposed between each writer lead and each reader lead. The isolation shield acts as a Faraday cage to reduce cross-talk between the write and read transducers. The SGV module is configured to write data to a tape using the write transducers and read verify the data written on the tape using the read transducers such that the write transducers and read transducers are concurrently operable.

27 Claims, 13 Drawing Sheets

(56) References Cited

U.S. PATENT DOCUMENTS

| | | | | |
|---|---|---|---|---|
| 9,001,463 | B2 * | 4/2015 | Biskeborn | G11B 5/3912 360/122 |
| 9,886,972 | B2 * | 2/2018 | Biskeborn | G11B 5/0083 |
| 10,121,498 | B2 * | 11/2018 | Biskeborn | G11B 5/2652 |
| 10,170,139 | B2 * | 1/2019 | Biskeborn | G11B 5/4893 |
| 10,832,712 | B1 | 11/2020 | Seagle et al. | |
| 10,984,823 | B2 * | 4/2021 | Biskeborn | G11B 5/3143 |
| 11,087,782 | B1 | 8/2021 | Brown et al. | |
| 11,514,929 | B2 * | 11/2022 | Biskeborn | G11B 5/23 |
| 11,532,320 | B1 * | 12/2022 | Biskeborn | G11B 5/1871 |
| 11,646,053 | B2 * | 5/2023 | Seagle | G11B 5/23 360/77.12 |
| 11,646,054 | B2 * | 5/2023 | Le | G11B 5/112 360/121 |
| 11,682,421 | B2 * | 6/2023 | Seagle | G11B 5/3977 360/128 |
| 2003/0016474 | A1 | 1/2003 | Biskeborn | |
| 2016/0336029 | A1 * | 11/2016 | Biskeborn | G11B 5/187 |
| 2023/0253014 | A1 * | 8/2023 | Biskeborn | G11B 5/00826 360/77.12 |

\* cited by examiner

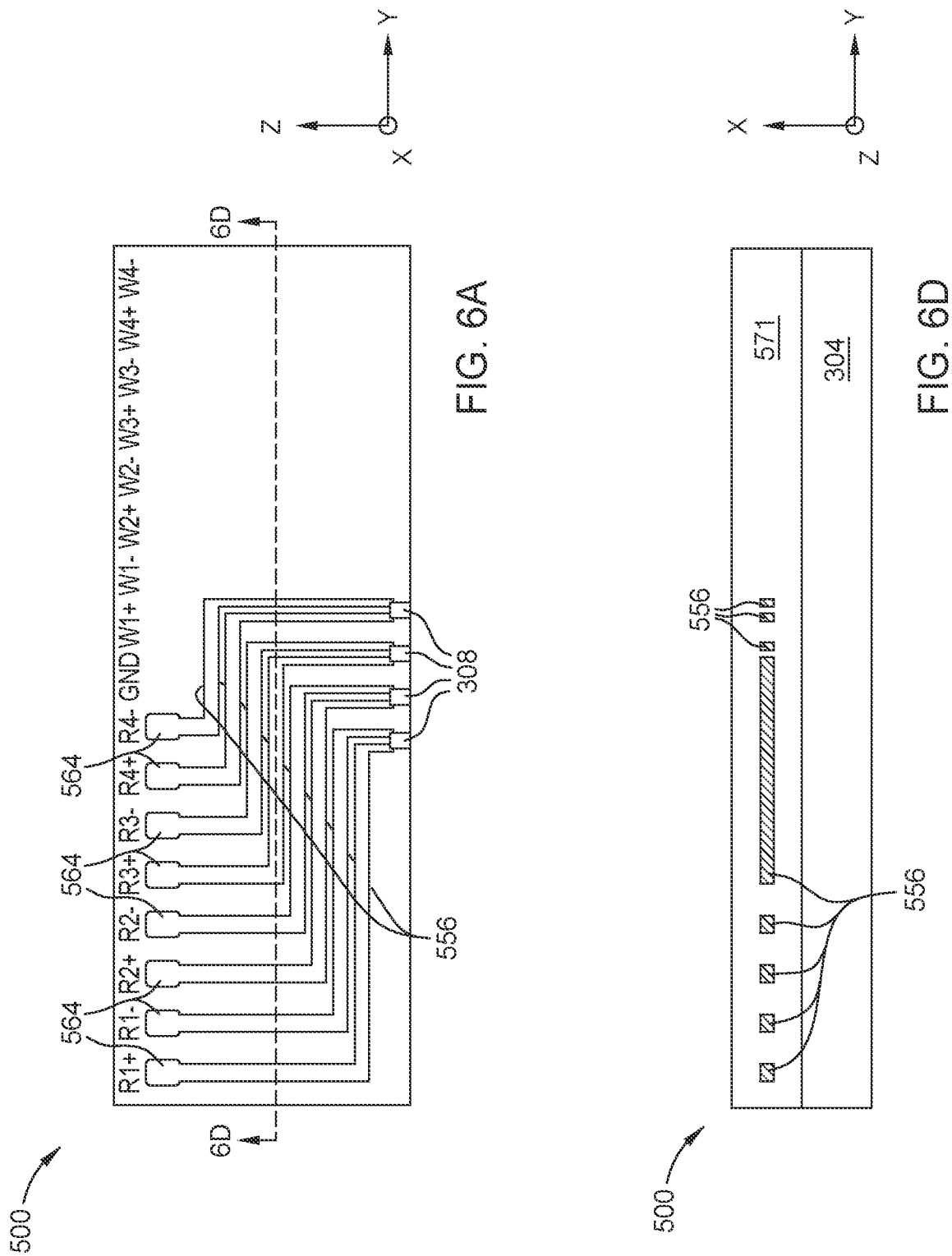

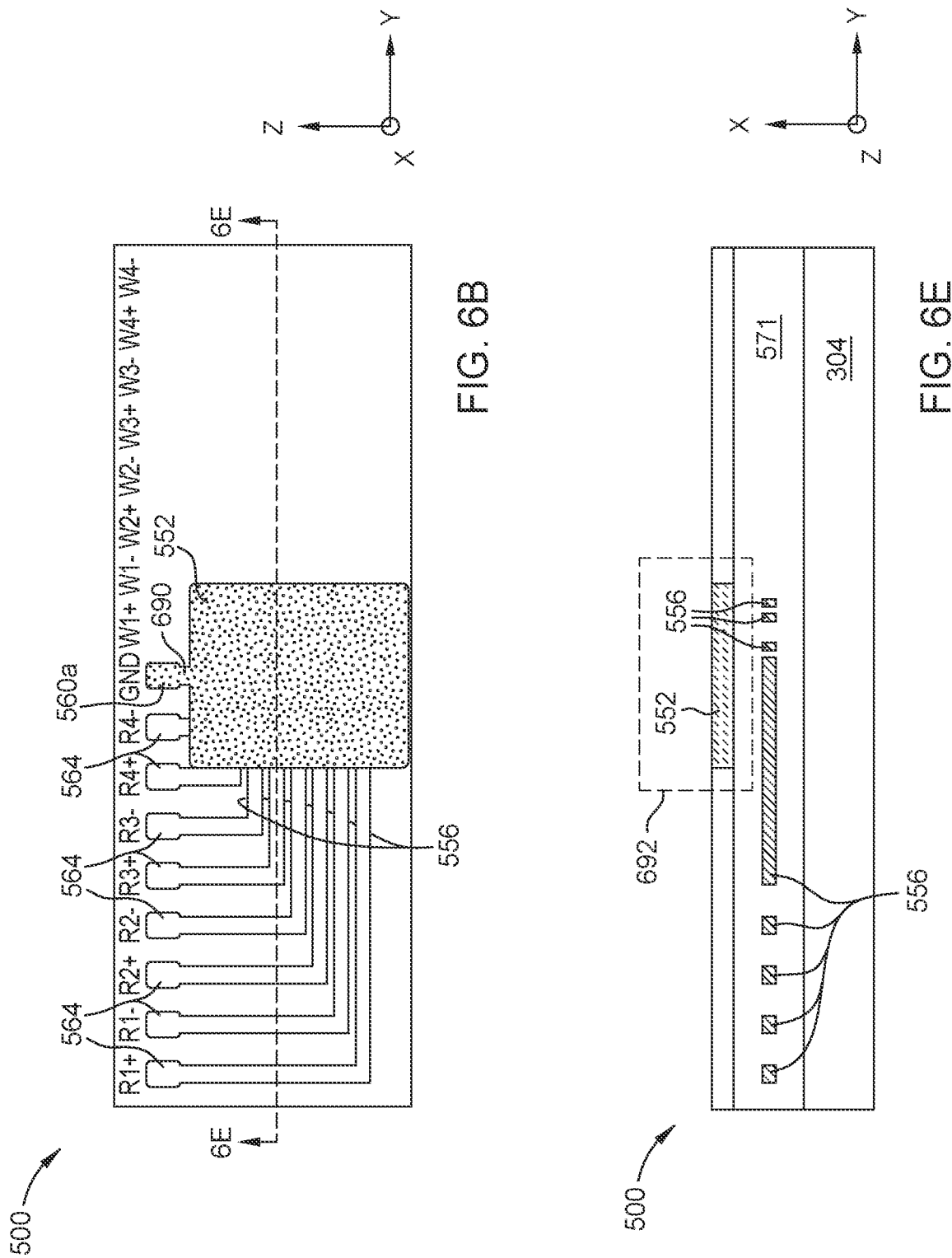

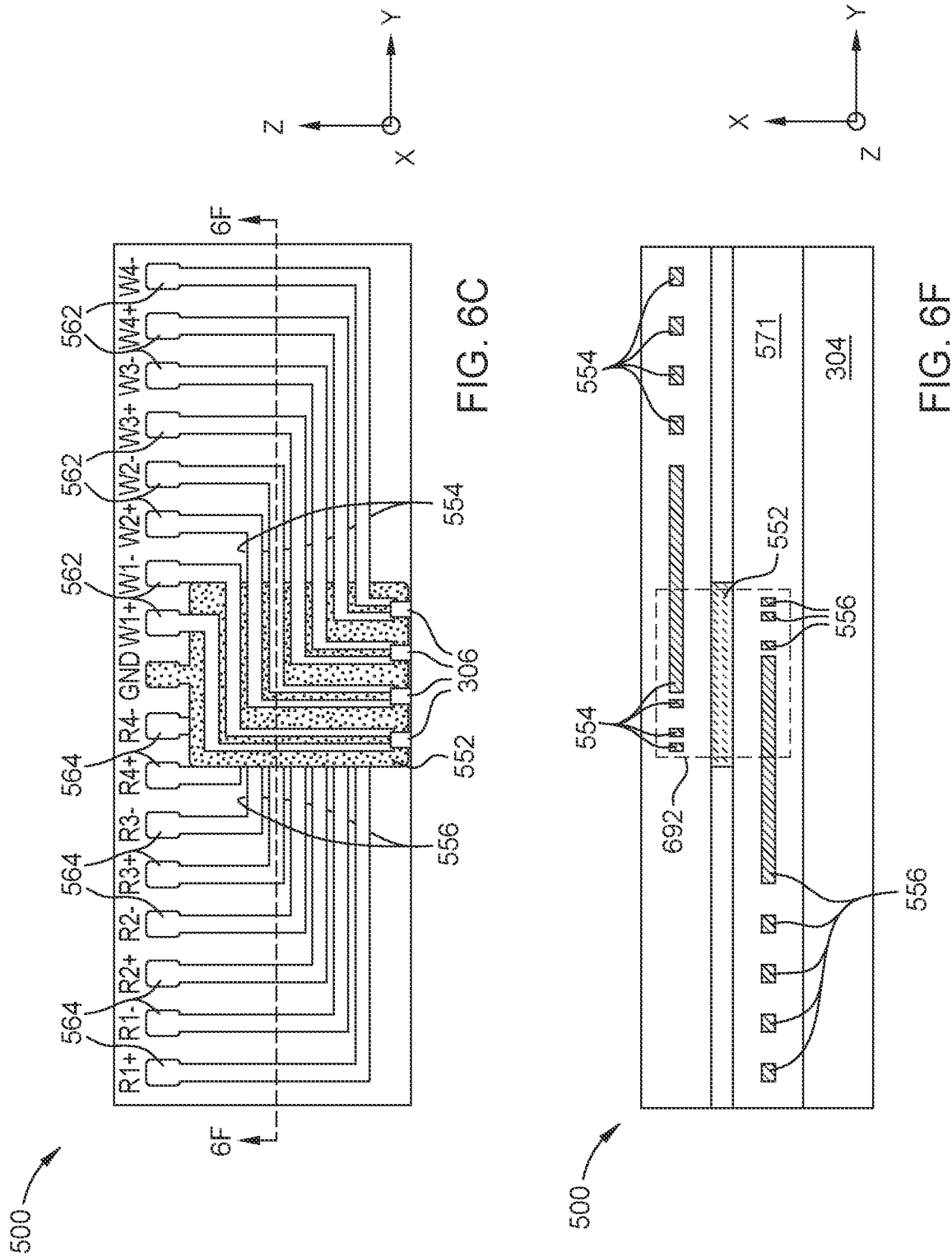

DUAL CIRCUIT ISOLATION OF WRITER TO READER CROSSTALK FOR SGV MODULES

CROSS-REFERENCE TO RELATED APPLICATIONS

This application claims benefit of U.S. provisional patent application Ser. No. 63/452,533, filed Mar. 16, 2023, which is herein incorporated by reference.

BACKGROUND OF THE DISCLOSURE

Field of the Disclosure

Embodiments of the present disclosure generally relate to a tape head and a tape drive including a tape head.

Description of the Related Art

Tape heads of tape drive systems are used to record and read back information on tapes by magnetic processes. Magnetic transducers of the tape heads read data from and write data onto magnetic recording media. Data is written on the magnetic recording media by moving a magnetic write transducer to a position over the media where the data is to be stored. The magnetic write transducer then generates a magnetic field, which encodes the data into the magnetic media. Data is read from the media by similarly positioning the magnetic read transducer and then sensing the magnetic field of the magnetic media.

In a tape drive system, the quantity of data stored on a magnetic tape may be increased by increasing the number of data tracks across the tape that the tape head is capable of writing to. By overlapping portions of data tracks (e.g., shingling data tracks), improvements to data storage quantities can be achieved. However, for various reasons, enabling read-verify for conventional tape heads requires use of two or more separate head structures, where one structure writes the data and the other read-verifies the data. A drawback is that the separate structures in conventional heads must be very precisely assembled to enable this function. Another drawback is that the heads are more susceptible to mis-registration between reader and upstream writer caused by tape skew, as a result of the unavoidable separation between the two. Yet another drawback is the time delay between the writing and the read-verifying may lead to a loss of data due to having to re-write larger blocks of data when an uncorrectable error occurs.

Therefore, there is a need in the art for a tape head configured to write and read verifying data within a single head structure.

SUMMARY OF THE DISCLOSURE

The present disclosure generally relates to a tape head and a tape head drive including a tape head. The tape head comprises at least one same gap verify (SGV) module comprising a plurality of write transducer and read transducer pairs. Each write transducer is coupled to writer bonding pads via writer leads, and each read transducer is coupled to reading bonding pads via reader leads. An isolation shield is disposed between the write transducer and read transducer such that the isolation shield is disposed between each writer lead and each reader lead. The isolation shield acts as a Faraday cage to reduce cross-talk between the write and read transducers. The SGV module is configured to write data to a tape using the write transducers and read verify the data written on the tape using the read transducers such that the write transducers and read transducers are concurrently operable.

In one embodiment, a same gap verify (SGV) module head assembly comprises a closure, a substrate disposed adjacent to the closure, a plurality of write transducer and read transducer pairs disposed between the closure and the substrate at a media facing surface, a plurality of write bonding pads disposed adjacent to the closure, a plurality of write leads, wherein one or more write bonding pads of the plurality of write bonding pads are coupled to each write transducer via one or more write leads of the plurality of write leads, a plurality of read bonding pads disposed adjacent to the plurality of write bonding pads, a plurality of read leads, wherein one or more read bonding pads of the plurality of read bonding pads are coupled to each read transducer via one or more read leads of the plurality of read leads, an isolation shield recessed from the media facing surface, the isolation shield being disposed between the write transducer and the read transducer of each pair such that the isolation shield is disposed between the plurality of write leads and the plurality of read leads, and at least one ground bonding pad, wherein the isolation shield is coupled to the at least one ground bonding pad, the closure, and the substrate.

In another embodiment, tape drive comprises one or more same gap verify (SGV) module head assemblies, each of the one or more SGV module head assemblies comprising: a closure, a substrate disposed adjacent to the closure, a plurality of write transducers disposed between the closure and the substrate at a media facing surface, a plurality of read transducers disposed between the closure and the substrate at the media facing surface, the plurality of read transducers being disposed adjacent to the plurality of write transducers, a plurality of write leads, one or more write leads of the plurality of write leads being coupled to each write transducer of the plurality of write transducers and one or more write bonding pads, a plurality of read leads, one or more read leads of the plurality of read leads being coupled to each read transducer of the plurality of read transducers and one or more read bonding pads, an isolation shield recessed from the media facing surface, the isolation shield being disposed between the plurality of write transducers and the plurality of read transducers such that the isolation shield is disposed between the plurality of write leads and the plurality of read leads, and at least one ground bonding pad, wherein the isolation shield is coupled to the at least one ground bonding pad, the closure, and the substrate, a write driver coupled to each write transducer of the plurality of write transducers through a write circuit, and a preamp coupled to each read transducer of the plurality of read transducers through a read circuit.

In yet another embodiment, a tape head comprises a closure, a substrate disposed adjacent to the closure, at least one ground bonding pad disposed adjacent to the closure, a plurality of write bonding pads disposed adjacent to the at least one ground bonding pad, a plurality of read bonding pads disposed adjacent to the plurality of write bonding pads, a plurality of write transducer and read transducer pairs disposed between the closure and the substrate at a media facing surface, wherein each write transducer and read transducer pair comprises: a first write lead and a second write lead, wherein first and second write leads are coupled to the write transducer, a first write bonding pad of the plurality of write bonding pads, and a second write bonding pad of the plurality of write bonding pads, and a first read lead and a second read lead, wherein first and second read leads are coupled to the read transducer, a first read bonding pad of the plurality of read bonding pads, and a second read bonding pad of the plurality of read bonding pads, and an isolation shield recessed from the media facing surface, the isolation shield being coupled to the at least one ground bonding pad, the closure, and the substrate, wherein the isolation shield is disposed between the write transducer and the read transducer of each pair such that the isolation shield is disposed between the first and second write leads and the first and second read leads of each pair.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 6A-6C illustrate wafer planar views of the isolation shield of the SGV module of FIGS. 5A-5D, according to various embodiments.

FIGS. 6D-6F illustrate cross-section views of the isolation shield of the SGV module of FIGS. 5A-5D, according to various embodiments, where FIG. 6D corresponds to FIG. 6A, FIG. 6E corresponds to FIG. 6B, and FIG. 6F corresponds to FIG. 6C.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure.

However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a tape head and a tape head drive including a tape head. The tape head comprises at least one same gap verify (SGV) module comprising a plurality of write transducer and read transducer pairs. Each write transducer is coupled to writer bonding pads via writer leads, and each read transducer is coupled to reading bonding pads via reader leads. An isolation shield is disposed between the write transducer and read transducer such that the isolation shield is disposed between each writer lead and each reader lead. The isolation shield acts as a Faraday cage to reduce cross-talk between the write and read transducers. The SGV module is configured to write data to a tape using the write transducers and read verify the data written on the tape using the read transducers such that the write transducers and read transducers are concurrently operable.

Figure 1A:
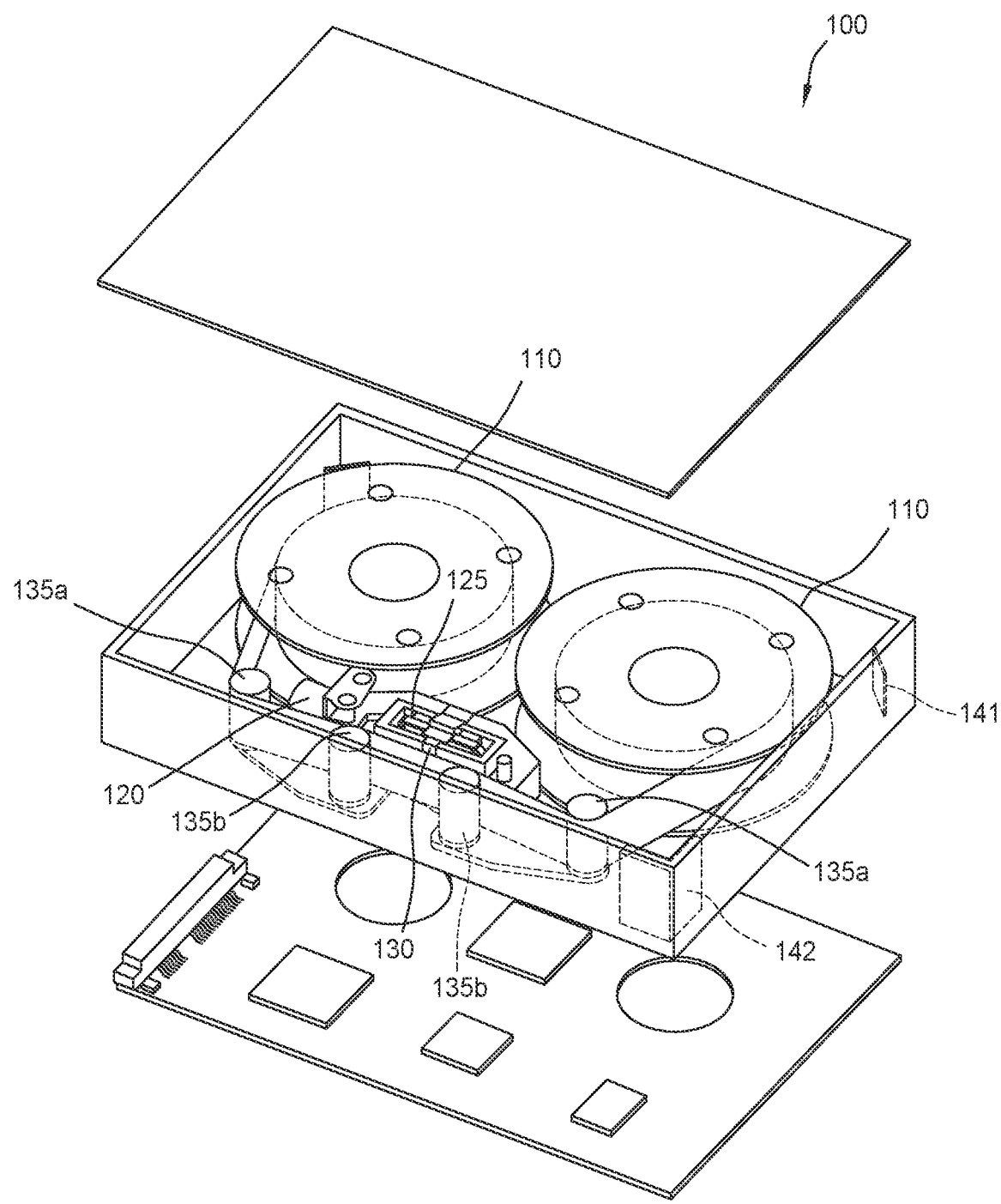
FIGS. 1A-1C illustrate a perspective exploded view, a simplified top down and side profile view of a tape drive, in accordance with some embodiments.
Figure 1B:
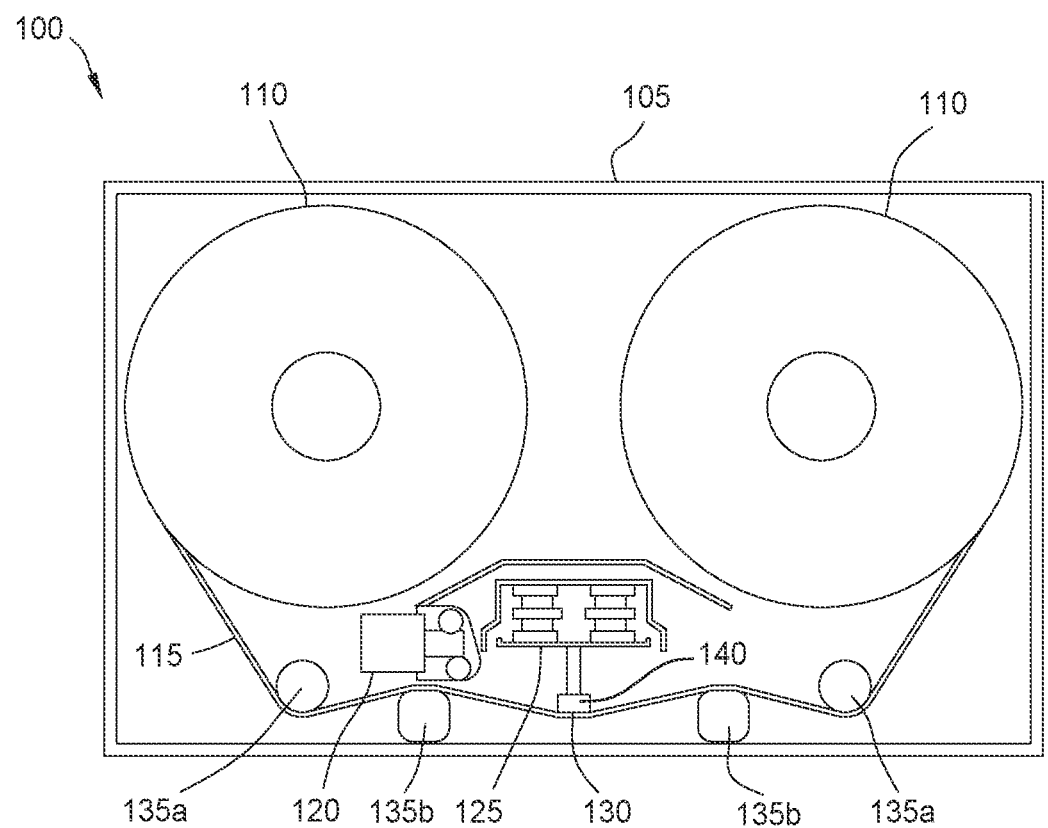
Figure 1C:
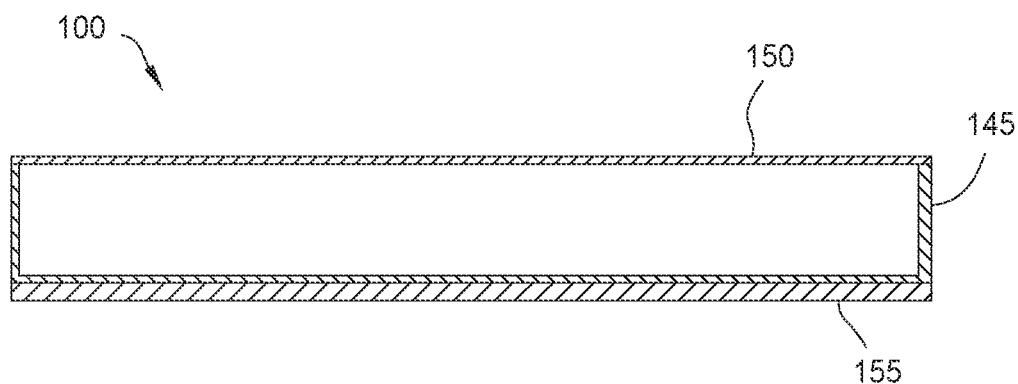

FIGS. 1A-1C illustrate a perspective exploded view, a simplified top down and side profile view of a tape drive 100, in accordance with some embodiments. The tape drive 100 may be a tape embedded drive (TED). Focusing on FIG. 1B, for example, the tape drive comprises a casing 105, one or more tape reels 110, one or more motors (e.g., a stepping motor 120 (also known as a stepper motor), a voice coil motor (VCM) 125, etc.) a head assembly 130 with one or more read heads and one or more write heads, and tape guides/rollers 135a, 135b. In the descriptions herein, the term "head assembly" may be referred to as "magnetic recording head", interchangeably, for exemplary purposes. Focusing on FIG. 1C, for example, the tape drive further comprises a printed circuit board assembly (PCBA) 155. In an embodiment, most of the components are within an interior cavity of the casing, except the PCBA 155, which is mounted on an external surface of the casing 105. The same components are illustrated in a perspective view in FIG. 1A. In the descriptions herein, the term "tape" may be referred to as "magnetic media", interchangeably, for exemplary purposes.

In the illustrated embodiments, two tape reels 110 are placed in the interior cavity of the casing 105, with the center of the two tape reels 110 on the same level in the cavity and with the head assembly 130 located in the middle and below the two tape reels 110. Tape reel motors located in the spindles of the tape reels 110 can operate to wind and unwind the tape media 115 in the tape reels 110. Each tape reel 110 may also incorporate a tape folder to help the tape media 115 be neatly wound onto the reel 110. One or more of the tape reels 110 may form a part of a removable cartridge and are not necessarily part of the tape drive 100. In such embodiments, the tape drive 100 may not be a tape embedded drive as it does not have embedded media, the drive 100 may instead be a tape drive configured to accept and access magnetic media or tape media 115 from an insertable cassette or cartridge (e.g., an LTO drive), where the insertable cassette or cartridge further comprises one or more of the tape reels 110 as well. In such embodiments, the tape or media 115 is contained in a cartridge that is removable from the drive 100. The tape media 115 may be made via a particulate dispersion or sputtering process to provide improved areal density. The tape media 115 comprises two surfaces, an oxide side and a substrate side. The oxide side is the surface that can be magnetically manipulated (written to or read from) by one or more read/write heads. The substrate side of the tape media 115 aids in the strength and flexibility of the tape media 115.

Tape media 115 from the tape reels 110 are biased against the guides/rollers 135a, 135b (collectively referred to as guides/rollers 135) and are movably passed along the head assembly 130 by movement of the reels 110. The illustrated embodiment shows four guides/rollers 135a, 135b, with the two guides/rollers 135a furthest away from the head assembly 130 serving to change direction of the tape media 115 and the two guides/rollers 135b closest to the head assembly 130 by pressing the tape media 115 against the head assembly 130.

As shown in FIG. 1A, in some embodiments, the guides/rollers 135 utilize the same structure. In other embodiments, as shown in FIG. 1B, the guides/rollers 135 may have more specialized shapes and differ from each other based on function. Furthermore, a lesser or a greater number of rollers may be used. For example, the two function rollers may be cylindrical in shape, while the two functional guides may be flat-sided (e.g., rectangular prism) or clip shaped with two prongs and the film moving between the prongs of the clip.

The voice coil motor 125 and stepping motor 120 may variably position the tape head(s) transversely with respect to the width of the recording tape. The stepping motor 120 may provide coarse movement, while the voice coil motor 125 may provide finer actuation of the head(s). In an embodiment, servo data may be written to the tape media to aid in more accurate position of the head(s) along the tape media 115.

In addition, the casing 105 comprises one or more particle filters 141 and/or desiccants 142, as illustrated in FIG. 1A, to help maintain the environment in the casing. For example, if the casing is not airtight, the particle filters may be placed where airflow is expected. The particle filters and/or desiccants may be placed in one or more of the corners or any other convenient place away from the moving internal components. For example, the moving reels may generate internal airflow as the tape media winds/unwinds, and the particle filters may be placed within that airflow.

There is a wide variety of possible placements of the internal components of the tape drive 100 within the casing 105. In particular, as the head mechanism is internal to the casing in certain embodiments, the tape media 115 may not be exposed to the outside of the casing 105, such as in conventional tape drives. Thus, the tape media 115 does not need to be routed along the edge of the casing 105 and can be freely routed in more compact and/or otherwise more efficient ways within the casing 105. Similarly, the head(s) 130 and tape reels 110 may be placed in a variety of locations to achieve a more efficient layout, as there are no design requirements to provide external access to these components.

As illustrated in FIG. 1C, the casing 105 comprises a cover 150 and a base 145. The PCBA 155 is attached to the bottom, on an external surface of the casing 105, opposite the cover 150. As the PCBA 155 is made of solid state electronics, environmental issues are less of a concern, so it does not need to be placed inside the casing 105. That leaves room inside casing 105 for other components, particularly, the moving components and the tape media 115 that would benefit from a more protected environment.

In some embodiments, the tape drive 100 is sealed. Sealing can mean the drive is hermetically sealed or simply enclosed without necessarily being airtight. Sealing the drive may be beneficial for tape film winding stability, tape film reliability, and tape head reliability. Desiccant may be used to limit humidity inside the casing 105.

In one embodiment, the cover 150 is used to hermetically seal the tape drive. For example, the drive 100 may be hermetically sealed for environmental control by attaching (e.g., laser welding, adhesive, etc.) the cover 150 to the base 145. The drive 100 may be filled by helium, nitrogen, hydrogen, or any other typically inert gas.

In some embodiments, other components may be added to the tape drive 100. For example, a pre-amp for the heads may be added to the tape drive. The pre-amp may be located on the PCBA 155, in the head assembly 130, or in another location. In general, placing the pre-amp closer to the heads may have a greater effect on the read and write signals in terms of signal-to-noise ratio (SNR). In other embodiments, some of the components may be removed. For example, the filters 141 and/or the desiccant 142 may be left out.

In various embodiments, the drive 100 includes controller 140 integrated circuits (IC) (or more simply "a controller 140") (e.g., in the form of one or more System on Chip (SoC)), along with other digital and/or analog control circuitry to control the operations of the drive. For example, the controller 140 and other associated control circuitry may control the writing and reading of data to and from the magnetic media, including processing of read/write data signals and any servo-mechanical control of the media and head module. In the description below, various examples related to writing and reading and verifying of written data, as well as control of the tape head and media to achieve the same, may be controlled by the controller 140. As an example, the controller 140 may be configured to execute firmware instructions for the various same gap verify embodiments described below.

Figure 2:
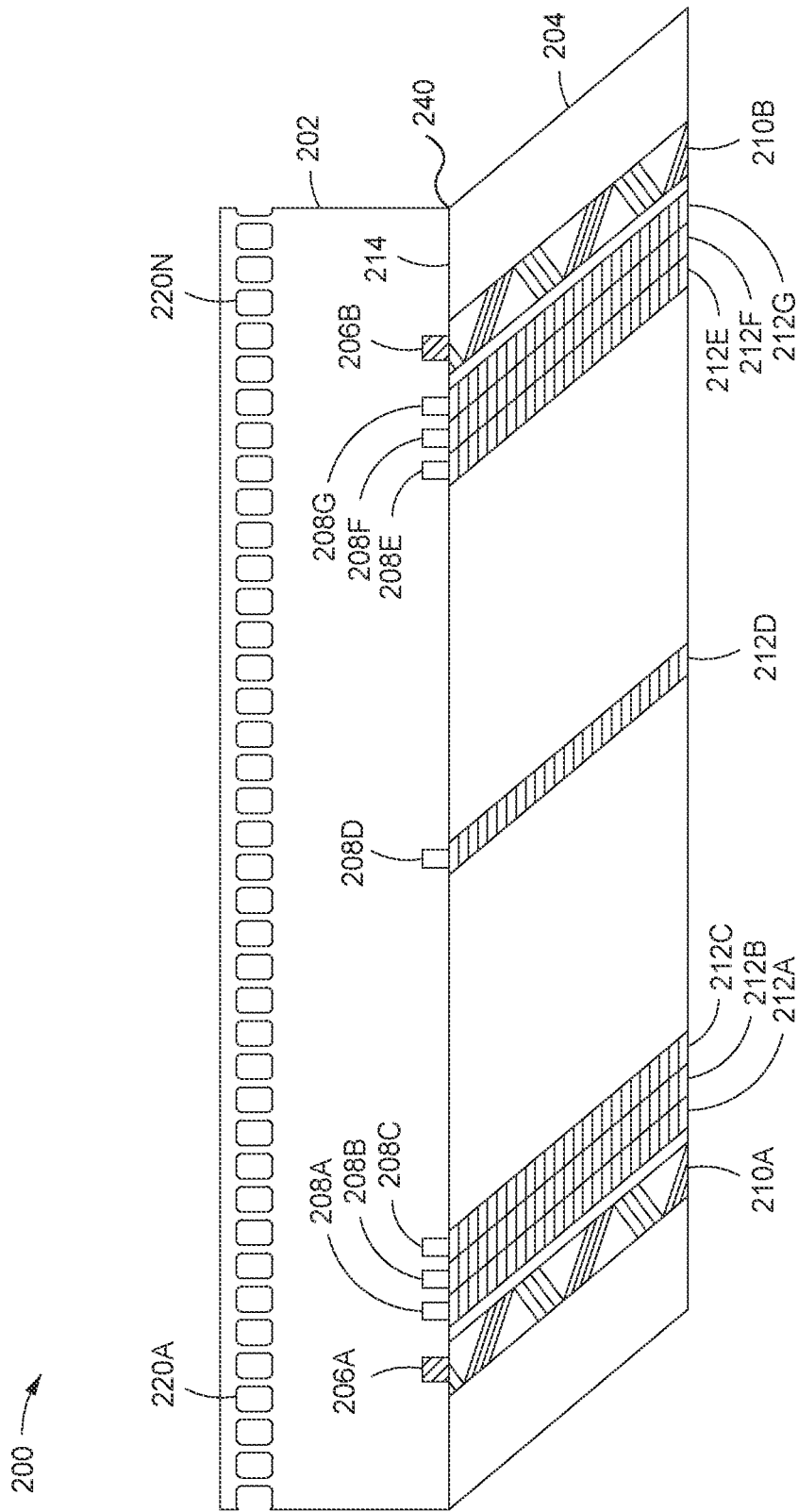
FIG. 2 is a schematic illustration of a tape head and tape that are aligned.

FIG. 2 is a schematic illustration of a portion of a tape head module 200 and a tape 204 that are aligned. The tape head module 200 comprises a tape head body 202 that is aligned with the tape 204. The tape 204 moves past the tape head module 200 during read and/or write operations. The tape head module 200 has a media facing surface (MFS) 214 that faces the tape 204. The tape head module 200 is coupled to a controller 240, which may be the controller 140 of FIG. 1.

The tape head body 202 comprises a first servo head 206A and a second servo head 206B spaced therefrom. It is to be understood that while two servo heads have been shown, the disclosure is not limited to two servo heads. Rather, it is contemplated that more or less servo heads may be present. A plurality of data heads 208A-208G is disposed between the first servo head 206A and the second servo head 206B. It is to be understood that while seven data heads have been shown, the disclosure is not limited to seven data heads. Rather, the number of data heads can be more or less than seven, depending on the requirements of the embodiment. For example there can be sixteen, thirty two, sixty four or more data heads utilized in the tape head body 202.

A plurality of pads 220A-220N is electrically coupled to the data head body 202. The plurality of pads 220A-220N coupled to the data head body 202 is not limited to the number shown in FIG. 2. Rather, more or less pads are contemplated. The pads 220A-220N are used to connect the drive electronics to the servo heads 206A, 206B and to data read and writer elements. The pads 220A-220N are used to establish the potential across the servo reader by means of a power supply (not shown) embedded in the tape head module 200.

The tape 204 comprises a first servo track 210A and a second servo track 210B. The first servo track 210A and the second servo track 210B are spaced apart allowing the tape head module 200 to monitor and control the average position of the data heads 208A-208G relative to the data tracks 212A-212G on the tape 204. It is to be understood that while two servo tracks have been shown, the disclosure is not limited to two servo tracks. Rather, the number of servo tracks can be more or less than two, depending on the requirements of the embodiment.

The tape 204 further comprises a plurality of data tracks 212A-212G disposed between the first servo track 210A and the second servo track 210B. It is to be understood that while seven data tracks have been shown, the disclosure is not limited to the seven data tracks. Rather, the number of data tracks can be more or less than seven, depending on the requirements of the embodiment. In the embodiment of FIG. 2, the first servo head 206A reads its lateral position information (e.g., alignment) over the first servo track 210A. The second servo head 206B is aligned with the second servo track 210B. The combined information allows the servo actuator of the tape head module 200 to align the data heads 208A-208G such that the center data track (e.g., 208D) is centered on tape 204. The plurality of data heads 208A-208G is thus individually aligned with the plurality of data tracks 212A-212N for best case positioning. In this embodiment the first servo head 206A, the second servo head 206B, the first servo track 210A, the second servo track 210B, the plurality of data heads 208A-208G, and the plurality of data tracks 212A-212G are able to read and/or write the data accurately because all are aligned perpendicular to the direction of travel of the tape 204.

Figure 3A:
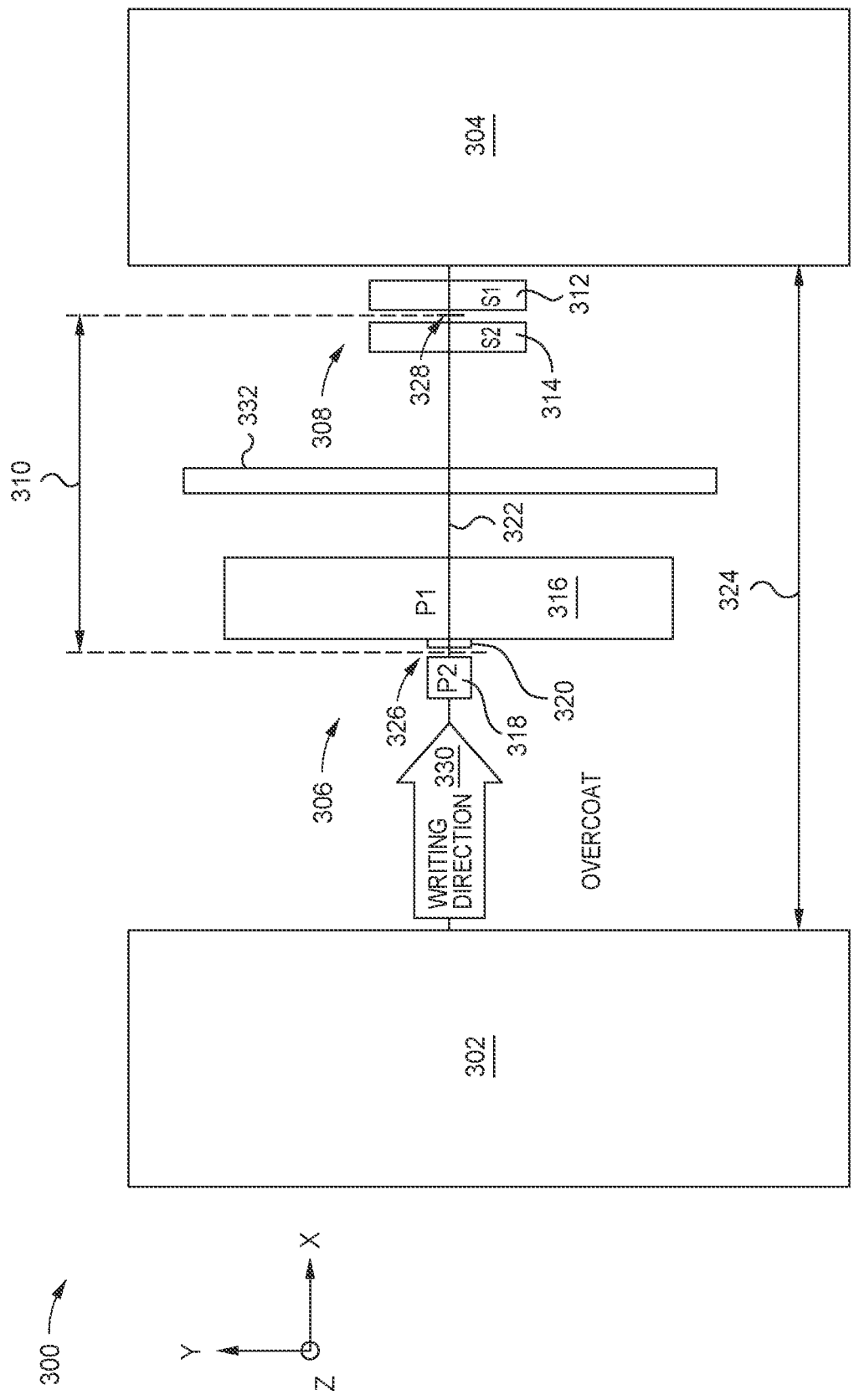
FIGS. 3A-3B illustrate a media facing surface (MFS) view of same gap verify (SGV) modules, according to various embodiments.
Figure 3B:
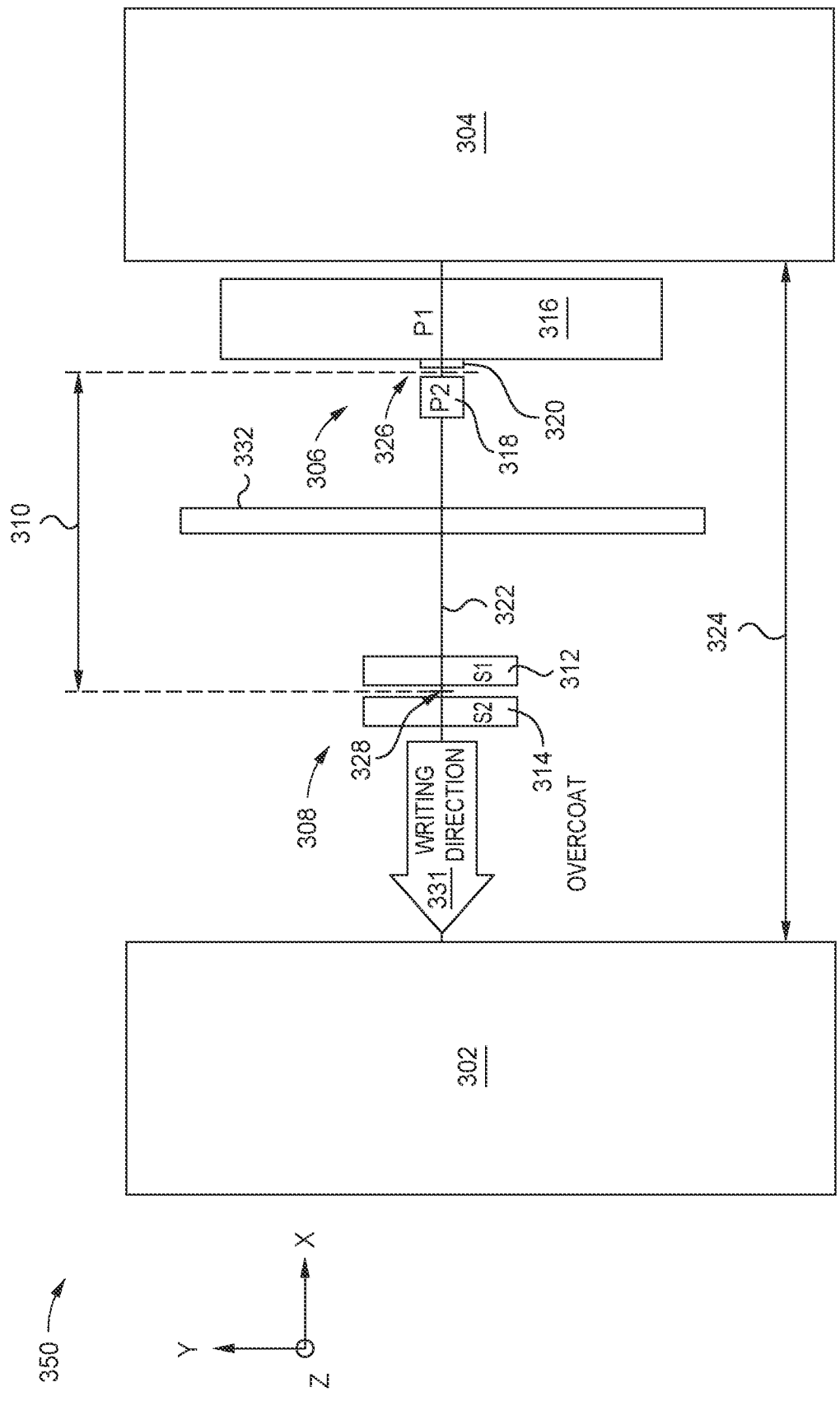

FIGS. 3A-3B illustrate a media facing surface (MFS) view of same gap verify (SGV) modules 300, 350, respectively, according to various embodiments. The SGV modules 300, 350 may be utilized within a tape drive comprising a controller, such as the TED or tape drive 100 of FIG. 1A. The SGV modules 300, 350 may be the tape head module 200 of FIG. 2.

The SGV module 300 comprises a closure 302, one or more write transducers 306 disposed adjacent to the closure 302, one or more read transducers 308 disposed adjacent to the one or more write transducers 306, and a substrate 304 disposed adjacent to the one or more read transducers 308. The SGV module 350 comprises a closure 302, one or more read transducers 308 disposed adjacent to the closure 302, one or more write transducers 306 disposed adjacent to the one or more read transducers 308, and a substrate 304 disposed adjacent to the one or more write transducers 306. Each of the one or more write transducers 306 and the one or more read transducers 308 are disposed on the substrate 304. The write transducer(s) 306 may be referred to as a writer(s) 306 or write head(s) 306, and the read transducer(s) 308 may be referred to as a reader(s) 308 or read head(s) 308.

While only one writer 306 and one reader 308 pair is shown in FIGS. 3A-3B, the SGV module 300 may comprise a plurality of writer 306 and reader 308 pairs, which may be referred to as a head array. For example, in some embodiments, the SGV modules 300, 350 each comprises a head array of 32 writers 306 and 32 readers 308, forming 32 writer 306 and reader 308 pairs, along with one or more servo readers (not shown). In each of the SGV modules 300, 350, each writer 306 and corresponding reader 308 have a read gap to write gap separation 310 in the x-direction of about 10 µm to about 15 µm.

In each of the SGV modules 300, 350, a writer 306 is spaced a distance 310 from a reader 308 such that the gap to gap spacing is about 6 µm to about 20 µm. In embodiments comprising a plurality of writer 306 and a plurality of reader 308 pairs, each writer 306 is spaced the distance 310 from an adjacent paired reader 308. The closure 302 is spaced a distance 324 from the substrate 304 of about 20 µm to about 60 µm. In some embodiments, a shield or thin film plate 332 is disposed between the writer 306 and the reader 308 of each pair to reduce magnetostatic cross-talk signals to the reader 308 from the writer 306. The plate 332, which may be referred to herein as a "null shield 332", may comprise permalloy and may be combined with Ir for wear resistance, for example.

One example implementation of the plate 332 is described in co-owned U.S. application Ser. No. 17/359,046, "Tape Head Design Having a Null Shield for Same Gap Verify," filed Jun. 25, 2021, which is hereby incorporated by reference.

Each of the writers 306 comprises a first write pole P1 316 and a second write pole P2 318. A notch 320 may be disposed on the P1 316. The notch 320 is disposed adjacent to a write gap 326, where the P1 316 is spaced from the P2 318 by a distance in the x-direction at least twice the length of the write gap 326. Each of the readers 308 comprises a first shield S1 312, a second shield S2 314, and a magnetic sensor 328 disposed between the S1 312 and the S2 314. The magnetic sensor 328 may be a tunnel magnetoresistance (TMR) sensor, for example. The write gap 326 and the magnetic sensor 328 are aligned or centered upon a center axis 322 in the y-direction such that the center axis 322 is aligned with a centerline of the write gap 326 and a centerline of the magnetic sensor 328. In embodiments in which the SGV module 300 is actively tilted, such as for compensating mismatch of the head array pitch to the tape track pitch, the writer 306 and the reader 308 may be offset relative to the center axis to align the read and write arrays at nominal tilt. In some embodiments, the distance 310 is measured from the write gap 326 to a free layer (not shown) of the magnetic sensor 328.

In the SGV module 300 of FIG. 3A, when writing data to a tape or other media, the tape moves over the writer 306 in the writing direction 330 (e.g., in the x-direction). In the SGV module 350 of FIG. 3B, when writing data to a tape or other media, the tape moves over the writer 306 in the writing direction 331 (e.g., in the −x-direction). This is essential because the overwriting data must first be written before it can be verified. Due at least in part to the distance 310 between the write gap 326 and the magnetic sensor 328 of a writer 306 and reader 308 pair, the writer 306 is able to write to the media, and the reader 308 is able to read the data to verify the data was written correctly. As discussed above, the plate 332 may be used to further reduce magneticostatic cross-talk between the writer 306 and the reader 308. Thus, the writer 306 is able to write data to a portion of the tape, and the paired reader 308 is able to read verify the newly written portion of the tape immediately. As such, the SGV module 300 is able to write data to and read verify data from a tape concurrently. The SGV module 350, similar constructed, also has this immediate verify capability. The array of readers 308 in either of the SGV modules 300, 350 are available much later after writing to be used for data recovery without powering the writer.

The SGV modules 300, 350 are each able to concurrently write and read data due in part to the separation distance 310 between the write gap 326 and the magnetic sensor 328 of a writer 306 and reader 308 pair. The write gap 326 and magnetic sensor 328 are spaced far enough apart that the amplitude of signals in the reader 308 that arise from coupling of magnetic flux from the paired writer 306 is reduced or substantially less than the readback signal of the reader 308 itself.

As used herein, the SGV modules 300, 350 being able to "concurrently" write and read data refers to the fact that both the writer 306 and the reader 308 are concurrently turned "on" or able to operate simultaneously with respect to various data written to a tape. However, it is to be noted that the writer 306 and the reader 308 are not "concurrently" operating on the same data at the same time. Rather, the writer 306 first writes data, and as the tape moves over the reader 308, the reader 308 is then able to read verify the newly written data as the writer 306 concurrently writes different data to a different portion of the tape. Furthermore, it is to be noted that a controller (not shown) is configured to operate the SGV modules 300, 350, and as such, the controller is configured to independently operate both the writer 306 and the reader 308. Thus, while the writer 306 is described as writing data and the reader 308 is described as reading the data, the controller enables the writer 306 to write and enables the reader 308 to read.

Figure 4:
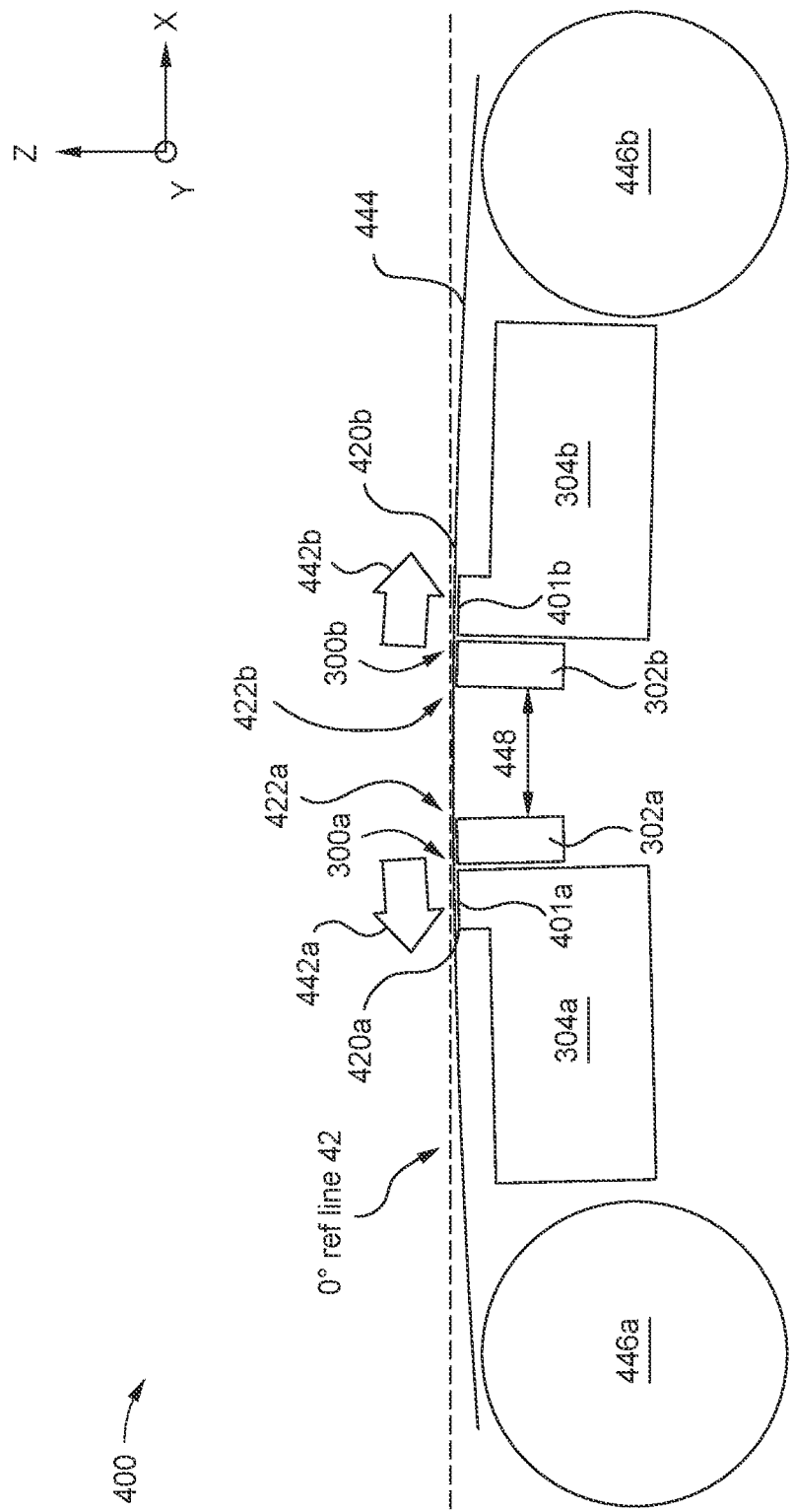
FIG. 4 illustrates a side view of a tape head comprising two SGV modules, according to one embodiment.

FIG. 4 illustrates a side view of a tape head 400 comprising two SGV modules 300a, 300b that are spaced apart, according to one embodiment. The tape head 400 comprises a first SGV module 300a and a second SGV module 300b. Each SGV module 300a, 300b may be the SGV module 300 or 350 shown in FIG. 3A or FIG. 3B, respectively. In some embodiments, the read and write transducers 308, 306 in the first and second SGV modules 300a, 300b may be aligned, to example, to operate in a legacy mode where one SGV module (e.g., the first SGV module 300a) writes data and the other SGV module (e.g., the second SGV module 300b) reads the data written by the first SGV module 300a. The tape head 400 illustrates a SGV tape head 400 where the tape 444 contacts both the MFS 401a of the first SGV module 300a and the MFS 401b of the second SGV module 300b simultaneously in both directions the tape 444 moves.

In one embodiment, the first SGV module 300a comprises a first closure 302a, one or more first writers 306 (shown in FIG. 3A) disposed adjacent to the first closure 302a, one or more first readers 308 (shown in FIG. 3A) disposed adjacent to the one or more first writers 306, and a first substrate 304a disposed adjacent to the one or more first readers 308. Similarly, in such an embodiment, the second SGV module 300b comprises a second closure 302b, one or more second writers 306 (shown in FIG. 3A) disposed adjacent to the second closure 302b, one or more second readers 308 (shown in FIG. 3A) disposed adjacent to the one or more second writers 306, and a second substrate 304b disposed adjacent to the one or more second readers 308. The first SGV module 300a has a first writing and reading direction 442a that is opposite to a second writing and reading direction 442b of the second SGV module 300b.

In one embodiment, the first SGV module 300a and the second SGV module 300b are arranged in a face-to-face configuration or arrangement such that the first closure 302a of the first SGV module 300a is disposed adjacent or proximate to the second closure 302b of the second SGV module 300b. In other words, the first SGV module 300a is a mirror image of the second SGV module 300b, the second SGV module 300b is a right hand module like that shown in FIG. 3A and the first SGV module 300a is a left hand module. The first SGV module 300a is spaced a distance 448 from the second SGV module 300b of about 100 μm to about 1000 μm.

In other embodiments, the first SGV module 300a and the second SGV module 300b are arranged in a substrate-to-substrate configuration or reversed configuration, where the first substrate 304a is disposed adjacent to the second substrate 304b, and tape 444 encounters or passes over either the first closure 302a or the second closure 302b prior to passing over either the first or second substrate 304a, 304b, respectively. In such a configuration where the first and second modules 300a, 300b are arranged like shown in FIG. 3A, the first module 300a has the second writing and reading direction 442b that is opposite to the first writing and reading direction 442a of the second SGV module 300b.

Referring to FIG. 4, which shows a SGV tape head 400, a MFS 401a, 401b of each of the first and second SGV modules 300a, 300b is configured to support a tape 444 or other magnetic media. The MFS 401a, 401b of each of the first and second SGV modules 300a, 300b includes surfaces of the writers 306 and the readers 308 of each SGV module 300a, 300b. The first SGV module 300a and the second SGV module 300b are both able to independently write and read verify data, like discussed above. The two modules 300a, 300b are necessary to accommodate write-first, read verify-second for a tape that will move in both directions. The tape 444 may contact and wrap around a first substrate corner 420a (e.g., a first skiving edge) and a first closure corner 422a (e.g., a second skiving edge) of the first SGV module 300a, and contact and wrap around a second closure corner 422b (e.g., a third skiving edge) and a second substrate corner 420b (e.g., a fourth skiving edge) of the second SGV module 300b, resulting in the tape 444 being bent or angled downwards from a 0° reference line 426 (e.g., parallel to the x-axis). In such a configuration, the tape 444 contacts both the MFS 401a and the MFS 401b simultaneously in both directions the tape 444 moves. Alternatively, the module that is not doing the writing (and thus not read-verifying) can be slightly withdrawn so that no contact is established between the tape and module, thus reducing friction in the tape path and unnecessary wear of the tape and module.

Figure 5A:
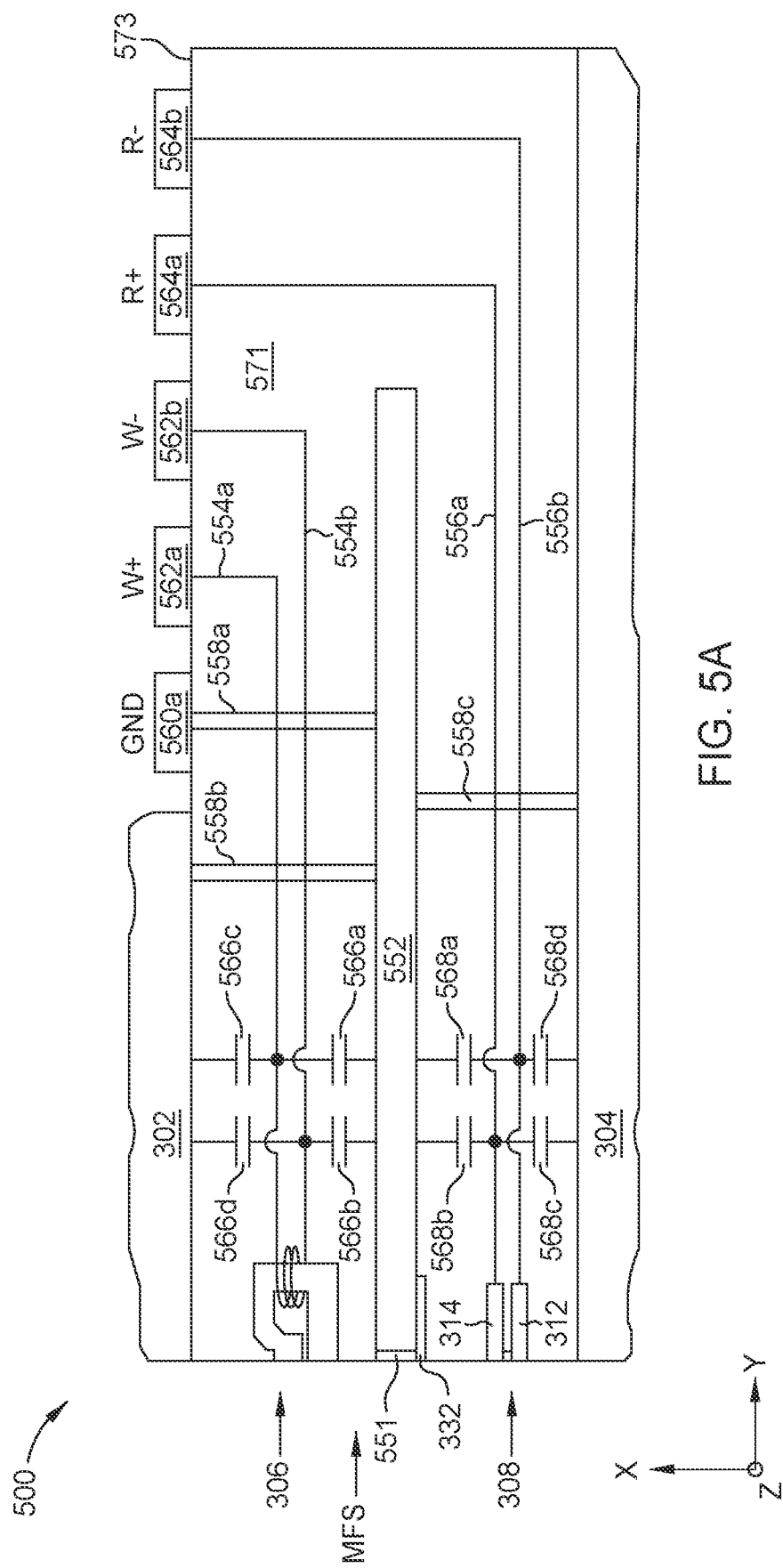
FIG. 5A illustrates a schematic cross-sectional view of a SGV module having an isolation shield disposed between the writer and the reader, according to one embodiment.
Figure 5B:
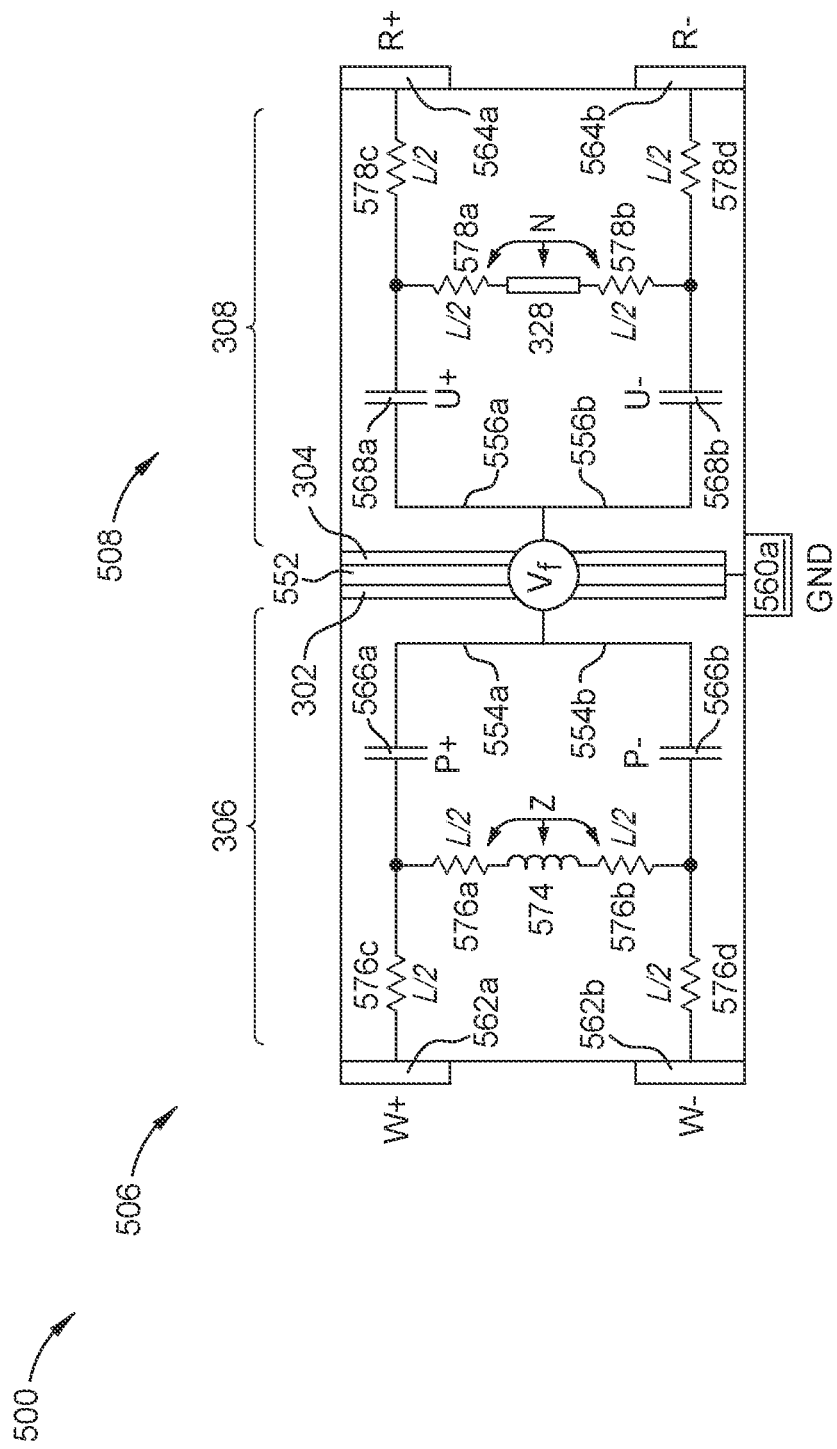
FIGS. 5B-5D illustrate an equivalent circuit schematic of various circuits of the SGV module of FIG. 5A, according to another embodiment.
Figure 5C:
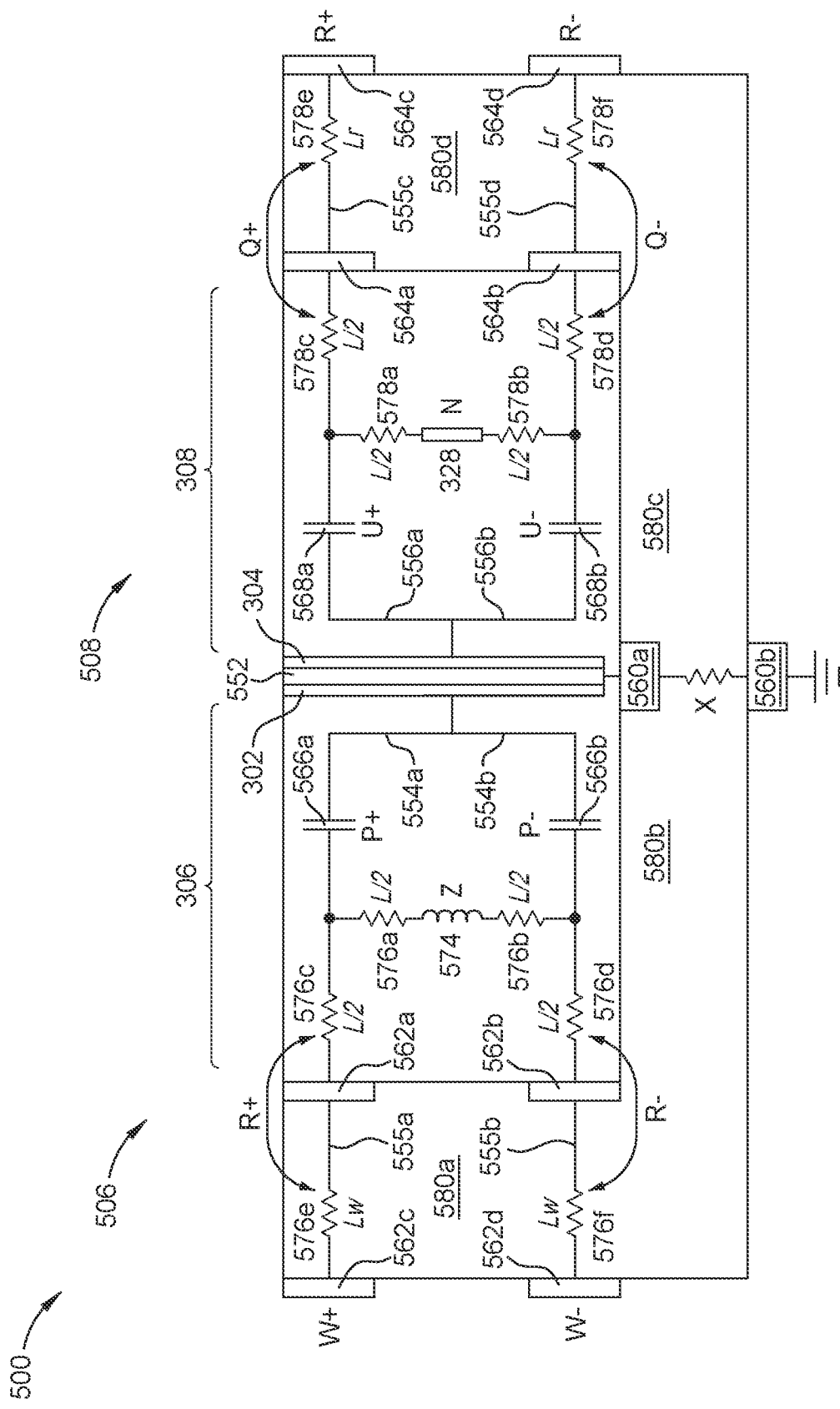
Figure 5D:
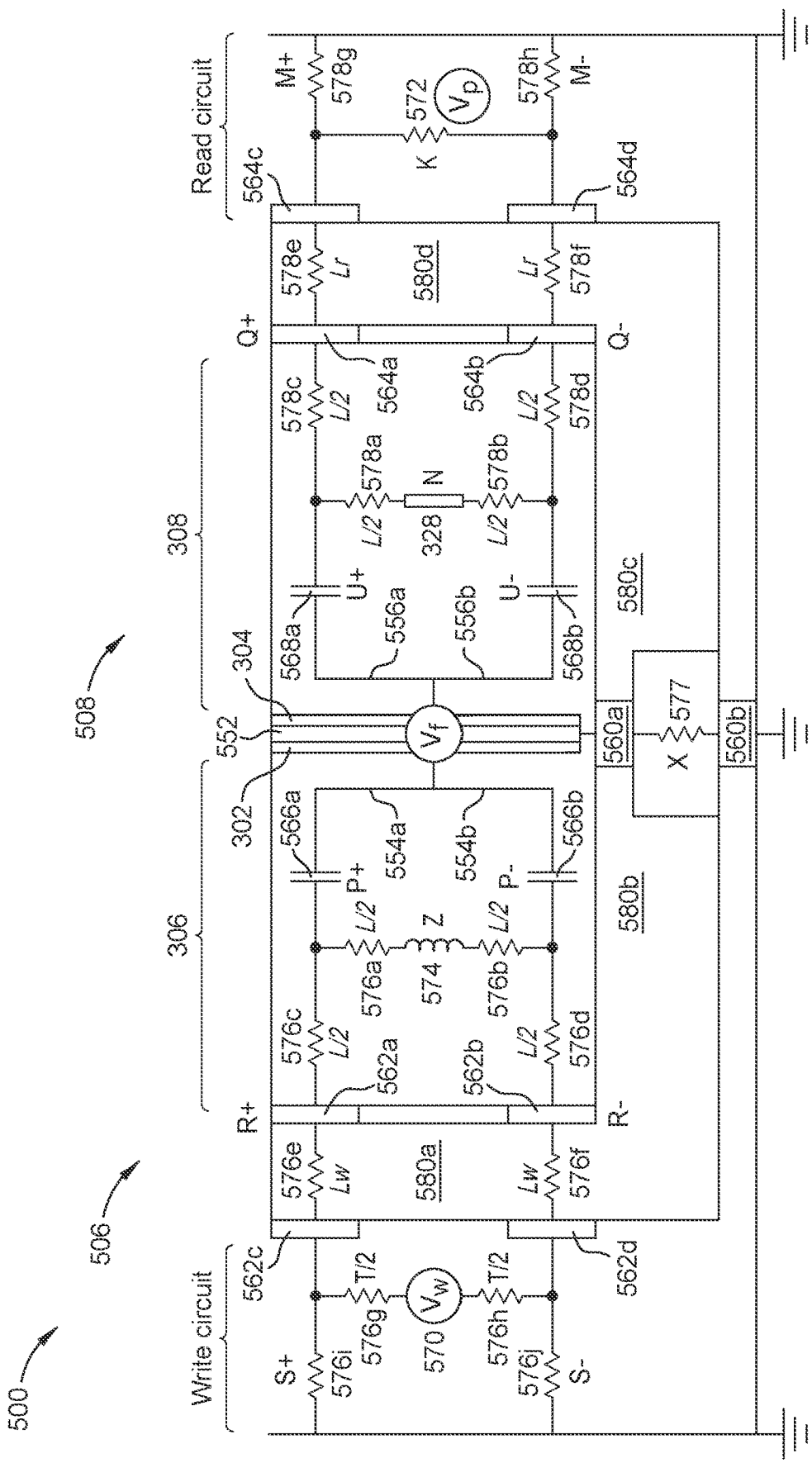

FIG. 5A illustrates a schematic cross-sectional view of a SGV module 500 having an electrical isolation shield 552 disposed between the writer 306 and the reader 308, according to one embodiment. FIGS. 5B-5D illustrate an electrical schematic of various circuits of the SGV module 500 of FIG. 5A, with cable 580, write driver 570, and read detector or preamp 572, according to another embodiment. The SGV module 500 may be utilized within a tape drive comprising a controller, such as the TED or tape drive 100 of FIG. 1A. The SGV module 500 of FIGS. 5A-5D may be the tape head module 200 of FIG. 2. The SGV module 500 of FIGS. 5A-5D may be the SGV module 300 or 350 shown in FIG. 3A or FIG. 3B. The SGV module 500 of FIGS. 5A-5D may be the SGV module 300a and/or the SGV module 300b of FIG. 4. Thus, aspects of FIGS. 5A-5D may be used in combination with aspects of FIGS. 3A-4. Furthermore, as noted above, the SGV module 500 shown in FIGS. 5A-5D may be configured to work in legacy mode.

While only one writer 306 and reader 308 pair are shown in FIGS. 5A-5D, the SGV module 500 may comprise a plurality of writers 306 and readers 308, like discussed above. In such an embodiment, one electrical isolation shield 552 extends between the plurality of writers 306 and the plurality of readers 308, as shown in FIGS. 6A-6F. The purpose of the isolation shield 552 is to eliminate all direct capacitive coupling between the writer and reader shields and all direct capacitive coupling between the write leads 554a, 554b and read leads 556a, 556b. Even though implemented, indirect coupling will still exist between all the writers 306 and each reader 308, as all leads 554a-556b will have parasitic capacitive coupling to the electrical isolation shield 552 via the capacitors 566a, 566b, 568a, and 568b; the writer leads 554a, 554b will have parasitic capacitive coupling to the closure 302 via the capacitors 566c and 566d; and the reader leads 556a, 556b will have parasitic capacitive coupling to the substrate 304 via the capacitors 568c and 568d. The isolation shield 552, the substrate 304, and the closure 302 make up a Faraday cage, and as such, may collectively be referred to herein as the "Faraday cage".

As shown in FIGS. 5C-5D, if the Faraday cage (composed of the isolation shield 552, the substrate 304, and the closure 302) is connected to the electrical circuit ground of other circuit components (i.e., that of write driver 570 and reader preamp 572), the isolation of the readers 308 and writers 306 would be complete and no electrical crosstalk would occur. However, the cable 580 (represented by cable regions 580a, 580b, 580c, 580d; collectively referred to herein as cable 580) shown in FIGS. 5C and 5D which attaches the circuit ground to the module on pad 560a of FIG. 5A will inevitably have some impedance (i.e., resistance and inductance) which will allow a portion of the writer voltage to couple to the Faraday cage and thus to the read preamp. This impedance is typically on the order of 10 Ohms which is not sufficient to reduce the large writer driver 570 voltage to a level well below the verification signal on the reader preamp 572. Write driver 570 voltages are on the order of several volts and verification signals are on the order of several millivolts, leading to a crosstalk issue. To verify the data, the crosstalk received at the preamp 572 should ideally be tens of microvolts or less. Thus, overall isolation of the write driver 570 to read preamp 572 needs to be on the order of an enormous −100 dB. To achieve this goal, differential write drivers are used (with near similar impedance on plus and minus sides) to balance out the write driver voltage on the Faraday cage, and differential read preamps are used (with near similar impedance on plus and minus sides) to allow the preamp to remove the common mode signal of the Faraday cage on the output of the preamp. Thus, 1) the positive/negative balance in the read circuit, 2) the positive/negative balance in the write circuit, and 3) the quality of the ground connection of the Faraday cage work together to achieve the −100 dB reduction, as will be described in more detail below.

As shown in FIG. 5A, an isolation shield (e-isolation) 552 is disposed between the writer 306 and the reader 308, recessed from the MFS. The isolation shield 552 extends over the entire surface where write leads 554a, 554b and read leads 556a, 556b overlap, like shown in FIGS. 6A-6F below. In some embodiments, a highly conductive material, such as Cu or Au, having a thickness of about 2 µm, is sufficient for isolation. More generally, the isolation shield 552 may comprise of Cu, Au, or any highly conductive, but non ferromagnetic material, and have a resistivity of less than 50 Ohms per square.

The edge of the isolation shield 552 may need to be recessed from the MFS a distance of about 2 µm to about 10 µm for reliability considerations. The isolation shield 552 is further disposed in contact with at least a portion of the plate 332 such that at least a portion of the plate 332 and the isolation shield 552 overlap and electrically connect. Thus, the plate 332 acts to bring the electrical isolation to the MFS. In other embodiments, an optional conductive material 551, such as NiCr having a thickness of about 2 µm to about 10 µm, may be disposed at the MFS adjacent to the isolation shield 552, to extend the Faraday cage to the MFS when the recession of the isolation shield 552 is required for reliability concerns, such as embodiments where the plate 332 is excluded. The isolation shield 552, electrically connected to the substrate 304 (via connection 558c) and to the closure 302 (via connection 558b), establishes an equipotential surface that wraps around and in between the entire reader 308 and writer 308 arrays, isolating one another.

The isolation shield 552 isolates signals from the writer 306 and the reader 308, preventing the writer 306 signals from coupling to the reader 308, when using the writer 306 and the reader 308 concurrently, as described above. The isolation shield 552 is connected to write-driver 570 and read-preamp 572's circuit ground through a bonding pad 560a via a first connection 558a. The isolation shield 552 is connected to the closure 302 via a second connection 558b, and is connected to the substrate 304 via a third connection 558c. The grounding of the isolation shield 552 for crosstalk reduction requirements is described below in FIGS. 5B-5D.

The writer 306 is connected to a first writer bonding pad 562a, or a positive writer connection (W+), via a first writer lead 554a, and is connected to a second writer bonding pad 562b, or a negative writer bonding pad (W−), via a second writer lead 554b. In some embodiments, the first and second writer leads 554a, 554b of the writer 306 may be coupled to a coil of the writer 306. The writer leads 554a, 554b may be collectively referred to herein as writer leads 554. Similarly, the reader 308 is connected to a first reader bonding pad 564a, or a positive reader bonding pad (R+), via a first reader lead 556a, and is connected to a second reader bonding pad 564b, or a negative reader connection (R−), via a second reader lead 556b. In some embodiments, the first and second reader leads 556a, 556b of the reader 308 are coupled to the first and second shields 312, 314 of the reader 308, respectively. The reader leads 556a, 556b may be collectively referred to herein as reader leads 556. The isolation shield 552 is spread in the Y-Z plane so that any direct capacitive coupling between the reader 308 and the writer 306 is blocked—that is, wherever the reader leads 556a, 556b and writer leads 554a, 554b overlap.

The ground bonding pad 560a, each first and second writer bonding pads 562a, 562b of the writer 306, and the first and second reader bonding pads 564a, 564b of the reader 308 are disposed adjacent to the closure 302, on a surface 573 of a dielectric material 571, which may comprise alumina, for example. All the bonding pads 560-564b typically form a single row aligned in the z-direction (but are shown aligned in the y-direction in the FIG. 5A schematic for convenience). The surface 573 of the dielectric material 571 is perpendicular to the MFS and in the Y-Z plane of FIG. 5A. The dielectric material 571 can be constructed through multiple depositions throughout the wafer build and is utilized to insulate the various electrical components of the SGV module 500, and is disposed between the closure 302 and the substrate 304.

The isolation shield 552 is parasitically coupled to the first writer lead 554a of the writer 306 via a first parasitic capacitor 566a, and is parasitically coupled to the second writer lead 554b of the writer 306 via a second such capacitor 566b. The closure 302 is parasitically coupled to the first writer lead 554a of the writer 306 via a first parasitic capacitor 566c, and is parasitically coupled to the second writer lead 554b of the writer 306 via a second such capacitor 566d. Similarly, the isolation shield 552 and the substrate 304 are connected to the first reader lead 556a of the reader 308 via capacitors 568a and 568c and the second reader lead 556b of the reader 308 via second capacitors 568b and 568d.

While the writer 306 is shown as being disposed adjacent to the closure 302, the reader 308 may instead be disposed adjacent to the closure 302 (e.g., switching the locations of the writer 306 and the reader 308). In such an embodiment, the parasitic capacitances merely swap and the net crosstalk will be the same.

FIG. 5B illustrates an equivalent circuit of the SGV module 500 of FIG. 5A for a single write transducer 306 and read element 308. FIG. 5B includes the Faraday cage separating the writer 306, the reader 308, and their associated parasitic capacitances and lead resistances as seen at the five bonding pads, W+, W−, R+, R−, and GND. The writer circuit 506 of each writer 306 couples to the isolation shield 552 via a first parasitic capacitor 566a (P+) connecting the midpoint of the first write lead 554a, and a second parasitic capacitor 566b (P−) similarly connected at the midpoint of the second writer lead 554b. The first writer lead 554a is connected to the W+ bonding pad 562a via the resistor 576c while the second writer lead 554b is connected to the W− bonding pad 562b via the resistor 576d.

The inductive write coil 574 and halves of each lead resistance 576a, 576b (L/2) can be modeled as a single impedance (Z). This is sufficient to model how the write driver 570 voltage is transferred from pads W+ and W− to the Faraday cage. The full transfer of interference to a given reader 308 requires consideration of B multiple writers, where B is the total number of writers 306, writing simultaneously with random data. All writers 306 are thus coupled to the Faraday cage and establish a net voltage, Vf, which results from the statistically independent random excitations of all B writers. The Faraday cage voltage, Vf, is then transferred to any given read element 308, which in turn transfers a portion across to its R+ and R− pads 564a, 564b.

The reader circuit 508 operates in a similar fashion. First reader lead 556a is connected to the R+ bonding pad 564a while the second reader lead 556b is connected to the R− bonding Pad 564b. The read element 308 with half of each lead resistance 578a, 578b (L/2) is modeled as a single impedance (N). Net parasitic reader capacitances 568a (U+) and 568b (U−) connect the read element 308 to the Faraday cage, and half of the lead resistances 578c, 578d on both sides connect the reader 308 to the R+ and R− bonding pads 564a, 564b. To complete the model of the head module, the Faraday cage is shown connected to the module's bonding pad 560a labeled GND.

The write circuit 506 is driven by a differential write driver 570 located in the tape drive, but is connect by a lengthy cable 580 (represented by cable regions 580a, 580b, 580c, 580d; collectively referred to herein as cable 580) of at least several inches shown in the combined circuit diagram of FIG. 5C. The cable leads 555a, 555b have impedance on the order of 10 Ohms and bonding pads 562c, 562d at both ends which allow electrical connection of the write driver 570 to the writer 306. Schematically, the cable 580 impedance and half the write lead resistance (via resistors 576e, 576f) can be combined into a single impedance (R+ and R−).

FIG. 5C shows a five pad equivalent circuit that the drive electronics bond to, for combined write current and read verification. The read circuit 508 connects to a differential preamplifier (preamp) 572 located in the tape drive, and also connected by leads 555c, 555d in a similar lengthy cable 580. A differential preamp 572 is essential in that it reduces the coupling of the Faraday Cage to the read preamp 572 if all positive (+) and negative (−) impedances are balanced. The smaller the imbalance, the smaller the transfer. General design practice separates the reader pads 564a-564d and the writer pads 562a-562d into separate groups on the module, and the cable 580 is designed to keep the various pads 562a-564d separated so as to not allow additional coupling of write current to read voltage. The read leads 555c, 555d of the cable 580 also have impedance on the order of 10 Ohms, and bonding pads 564c, 564d at both ends to allow electrical connection of the read element 308 to the preamp 572 through bonding pads 564c (R+) and 564d (R−). Schematically, the cable 580 impedance and half a read lead resistance (via resistors 578c, 578e) can be combined into a single impedance (Q+), and the cable 580 impedance and half a read lead resistance (via resistors 578d, 578f) can be combined into a single impedance (Q−).

FIG. 5D adds equivalent circuits for the write driver 570 and the preamp 572 connected to the five pad cable/module combination of FIG. 5C. The write driver 570 has an equivalent circuit with a source voltage, Vw, and half its source impedance (T/2) on either side (via resistors 576g, 576h). The write driver 570 bonds directly to the cable bonding pads 562c (W+) and 562d (W−) of FIG. 5C. The write driver 570 is connected to circuit ground 560b either intentionally or parasitically by two approximately balanced impedances 576i (S+) and 576j (S−).

Likewise, the read preamp 572 has a single impedance, K but also has intentional or parasitic impedance (578g (M+) and 578h (M−)) to circuit ground 560b. These impedances (M+, M−) are large and approximately balanced. Generally, the write drivers 570 and the read preamps 572 are located in separate integrated circuits in order to prevent crosstalk within the silicon of the pads 562c, 562d, 564c, 564d, and have a common ground 560b which is connected to the bonding pad 560a of the Faraday Cage of the cable 580 in FIG. 5D. The length of the cable 580 inevitably means an impedance of about 10 Ohms via resistor 577 will separate the ground 560a of the Faraday cage from that of the ground 560b of the circuits.

Overall, transfer of write voltage (Vw from writers 308, Vf from Faraday cage, and Vp at the readers 308) from the array of 'B' write drivers 570 to a given reader 308 will be determined by three parasitic effects: 1) imbalance of the combined write circuit (write driver 570/cable 580/writer 306); 2) imbalance of the combined read circuit (read element 308/cable 580/preamp 572); and 3) non-zero impedance of cable 580 connecting circuit ground 560b to the Faraday cage.

As labeled in FIGS. 5A-5D, each of X, S, P, Q, U, N, K, T, M, Z, and R represents impedances. The plus sign designates one side of the differential write driver 570 and one side of the reader preamp 572 while the minus sign designates the opposite sides. In general, each plus and minus impedance pair should be as equal as possible by design. But residual small impedance differences will exist due to non-zero manufacturing tolerances. Without a grounded Faraday cage, the circuits would have to be held to an enormous 1 part in 100,000 accuracy (−100 dB). But setting the impedance of the isolation shield 552 to the circuit ground (X) will meet the below criterion for crosstalk reduction sufficient to allow concurrent verification (CT) shown in Equation 1, where CT is a portion of the writer voltage from the write driver 570 that reaches the reader preamp 572.

$$X < CT \cdot F/W \cdot R \cdot A \cdot K \qquad \text{Equation 1}$$

In Equation 1, F=S+P, which is the parasitic impedance of the writer circuit 506 around the full ground loop (not including X);

K=Z/(Z+2R+T), which is the fraction of the write voltage that reaches the writer 306 (approximately =1 to minimize write voltage requirements);

W=(S+−S−)/(S++S−)+(R+−R−)/(R++R−)+(P+−P−)/(P++P−), which is the net impedance misbalance of the writer circuit;

R=(U+−U−)/(U++U−)+(Q+−Q−)/(Q++Q−)+(M+−M−)/(M++M−), which is the net impedance misbalance of the reader circuit;

A=(N/K)/(U+M), which is the impedance of the reader 308/preamp 572 relative to the reader's 308 impedance to ground;

During typical operation, the write driver 570 outputs about 3 volts to about 5 volts (Vw) when writing. Residual voltage (Vf) of about 3 mV from the write driver 570 is then transferred to the Faraday cage (due to the net writer imbalance W). If the Faraday cage could be connected directly to circuit ground (i.e., X=0), no writer residual voltage would pass through to the reader circuit 508. However, in the more realistic case where X is about 10 Ohms, a large reduction (X/F) of this voltage is transferred to the Faraday cage. Thus, the Faraday cage can have voltage on the order of millivolts per write head 308 or about 10 millivolts when accounting for all 'B' writer channels operating simultaneously with statistically independent data. The isolation shield 552 then transfers a residual voltage of less than about 30 uV (Vp) to the preamp 572, which is sufficient enough reduction to allow for the preamp to recover and verify written data with conventional elements and detectors.

By approximately grounding the isolation shield 552 per the impedance and other circuit considerations of the writer and reader circuits, the amount of residual voltage transferred from the write driver 570 to the preamp 572 is reduced.

Equation 1 can be re-arranged for an expression for the cross-talk (CT), which relates the cross-talk to the circuit parameters, as shown in Equation 2:

$$CT=(X/F)\cdot W\cdot R\cdot A\cdot K \qquad \text{Equation 2}$$

Equation 2 allows a circuit to be designed to meet a target cross-talk. As an example, a very reasonable target for manufacturing distributions in electronic design is 1 part in 20. By designing a head/cable/silicon system such that: X/F=W=A=R=K=1/20, a crosstalk reduction of −104 dB (1/160,000) is achieved.

FIGS. 6A-6C illustrate wafer planar views of the isolation shield 552 of the SGV module 500, according to various embodiments. FIGS. 6D-6F illustrate cross-section views of the isolation shield 552 of the SGV module 500, according to various embodiments, where FIG. 6D corresponds to FIG. 6A, FIG. 6E corresponds to FIG. 6B, and FIG. 6F corresponds to FIG. 6C. FIGS. 6A-6F show the geometry and vertical location of the bonding pad positions 562, 564, reader leads 556, isolation shield 552, and writer leads 554, and the insolation between each. For simplicity, a four head array is illustrated.

FIG. 6A illustrates the layout of the reader leads 556 which connect the read elements 308 to the location where vias are built up to their pads 564. FIG. 6D shows a substrate 304 with an insulating undercoat with the leads 556 followed by a planarized upper insulation or dielectric layer 571.

FIGS. 6B and 6E continue the build with the isolation shield 552 in the region 692 where the reader and writer pads 562, 564 will overlap. The isolation shield 552 is also brought to the final pad 560a at the top using a finger 690 that vias can be built on. The isolation shield 552 is planarized for subsequent processing of the writers 306. FIG. 6C shows the writer leads 554 which connect the write transducers 306 to the location where vias are built up to their pads 562. As shown in FIG. 6F, the isolation shield 552 is disposed fully in the region 692 where the reader leads 556 and the writer leads 554 overlap. Note that the isolation shield 552 size is greater than the region 692 where the writer leads 554 and reader leads 556 overlap. The size of the isolation shield 552 prevents any direct capacitive coupling of the readers 308 and writers 306.

By including the grounded isolation shield between the reader and writer leads, the amount of residual voltage transferred from the write drive of the writer to the preamp of the reader is reduced. By reducing the voltage on the preamp relative to the write driver, the cross-talk between the writer and the reader is reduced to about −100 dB, isolating the reader from the writer to enable the writer and the reader to work concurrently to read-verify data. As such, the grounded isolation shield isolates a tape head having dual circuits, one circuit for the writer and/or write driver, and another for the reader and/or preamp.

In one embodiment, a same gap verify (SGV) module head assembly comprises a closure, a substrate disposed adjacent to the closure, a plurality of write transducer and read transducer pairs disposed between the closure and the substrate at a media facing surface, a plurality of write bonding pads disposed adjacent to the closure, a plurality of write leads, wherein one or more write bonding pads of the plurality of write bonding pads are coupled to each write transducer via one or more write leads of the plurality of write leads, a plurality of read bonding pads disposed adjacent to the plurality of write bonding pads, a plurality of read leads, wherein one or more read bonding pads of the plurality of read bonding pads are coupled to each read transducer via one or more read leads of the plurality of read leads, an isolation shield recessed from the media facing surface, the isolation shield being disposed between the write transducer and the read transducer of each pair such that the isolation shield is disposed between the plurality of write leads and the plurality of read leads, and at least one ground bonding pad, wherein the isolation shield is coupled to the at least one ground bonding pad, the closure, and the substrate.

The isolation shield comprises Cu or Au (or any thickness nonmagnetic metal with sheet resistance less than about 50 mOhms/square) and has a thickness of about 1 μm to about 10 μm. The SGV module head assembly may further comprises a plurality of thin film plates disposed at the media facing surface, wherein a thin film plate of the plurality of thin film plates is disposed between the write transducer and the read transducer of each pair. The isolation shield is disposed on each of the plurality of thin film plates. The SGV module head assembly further comprises a conductive material disposed between the media facing surface and the isolation shield. The isolation shield is recessed from the media facing surface a distance of about 2 μm to about 10 μm. The SGV module head assembly is controllable to write data to a media using the write transducer of each pair and to read verify the data using the read transducer of each pair. A tape head comprises the SGV module head assembly. A tape drive comprises the tape head. The tape drive further comprises a write driver coupled to the write transducer of each pair through a write circuit, a preamp coupled to the read transducer of each pair through a read circuit. A cross-talk (CT) of the SGV module head assembly is determined based on an equation of CT=(X/F)*W*R*A*K, where X is an impedance of the isolation shield, F is a parasitic impedance of the write circuit, W is a net impedance misbalance of the write circuit, R is a new impedance misbalance of the read circuit, A is an impedance of the plurality of read transducers and the preamp relative to an impedance of the plurality of read transducers to ground, and K is a fraction of a write voltage transferred to the plurality of write transducers.

In another embodiment, tape drive comprises one or more same gap verify (SGV) module head assemblies, each of the one or more SGV module head assemblies comprising: a closure, a substrate disposed adjacent to the closure, a plurality of write transducers disposed between the closure and the substrate at a media facing surface, a plurality of read transducers disposed between the closure and the substrate at the media facing surface, the plurality of read transducers being disposed adjacent to the plurality of write transducers, a plurality of write leads, one or more write leads of the plurality of write leads being coupled to each write transducer of the plurality of write transducers and one or more write bonding pads, a plurality of read leads, one or more read leads of the plurality of read leads being coupled to each read transducer of the plurality of read transducers and one or more read bonding pads, an isolation shield recessed from the media facing surface, the isolation shield being disposed between the plurality of write transducers and the plurality of read transducers such that the isolation shield is disposed between the plurality of write leads and the plurality of read leads, and at least one ground bonding pad, wherein the isolation shield is coupled to the at least one ground bonding pad, the closure, and the substrate, a write driver coupled to each write transducer of the plurality of write transducers through a write circuit, and a preamp coupled to each read transducer of the plurality of read transducers through a read circuit.

The isolation shield reduces residual voltage from the write driver from being transferred to the preamp. The isolation shield is further coupled to each write transducer of the plurality of write transducers and each read transducer of the plurality of read transducers via one or more parasitic capacitors. Each of the one or more SGV module head assemblies further comprises a plurality of thin film plates disposed between the plurality of write transducers and the plurality of read transducers, and wherein the isolation shield is disposed in contact with the plurality of thin film plates. The isolation shield has a length greater than or equal to a length of the plurality of write leads which overlap any read leads. The plurality of write transducers are spaced a distance of about 5 μm to about 20 μm from the plurality of read transducers. The tape drive further comprises a controller, wherein the controller is configured to write data to a media using the plurality of write transducers and to read verify the data using the plurality of read transducers. A cross-talk (CT) of the one or more SGV module head assemblies is determined based on an equation of $CT=(X/F)*W*R*A*K$, where X is an impedance of the isolation shield, F is a parasitic impedance of the write circuit, W is a net impedance misbalance of the write circuit, R is a new impedance misbalance of the read circuit, A is an impedance of the plurality of read transducers and the preamp relative to an impedance of the plurality of read transducers to ground, and K is a fraction of a write voltage transferred to the plurality of write transducers.

In yet another embodiment, a tape head comprises a closure, a substrate disposed adjacent to the closure, at least one ground bonding pad disposed adjacent to the closure, a plurality of write bonding pads disposed adjacent to the at least one ground bonding pad, a plurality of read bonding pads disposed adjacent to the plurality of write bonding pads, a plurality of write transducer and read transducer pairs disposed between the closure and the substrate at a media facing surface, wherein each write transducer and read transducer pair comprises: a first write lead and a second write lead, wherein first and second write leads are coupled to the write transducer, a first write bonding pad of the plurality of write bonding pads, and a second write bonding pad of the plurality of write bonding pads, and a first read lead and a second read lead, wherein first and second read leads are coupled to the read transducer, a first read bonding pad of the plurality of read bonding pads, and a second read bonding pad of the plurality of read bonding pads, and an isolation shield recessed from the media facing surface, the isolation shield being coupled to the at least one ground bonding pad, the closure, and the substrate, wherein the isolation shield is disposed between the write transducer and the read transducer of each pair such that the isolation shield is disposed between the first and second write leads and the first and second read leads of each pair.

The isolation shield is recessed from the media facing surface a distance of about 2 μm to about 10 μm. The isolation shield comprises Cu. The isolation shield has a thickness of about 2 μm to about 10 μm. The isolation shield is recessed from the media facing surface between the write transducer and the read transducer of each pair by a conductive material. The isolation shield has a length greater than or equal to a length of the first and second write leads of each pair. A tape drive comprises the tape head. The tape drive further comprises a write driver coupled to the write transducer of each pair through a write circuit, a preamp coupled to the read transducer of each pair through a read circuit, and a controller, the controller being configured to write data to a media using the write transducer of each pair and to read verify the data using the read transducer of each pair. A cross-talk (CT) of the tape head is determined based on an equation of $CT=(X/F)*W*R*A*K$, where X is an impedance of the isolation shield, F is a parasitic impedance of the write circuit, W is a net impedance misbalance of the write circuit, R is a new impedance misbalance of the read circuit, A is an impedance of the plurality of read transducers and the preamp relative to an impedance of the plurality of read transducers to ground, and K is a fraction of a write voltage transferred to the plurality of write transducers.

While the foregoing is directed to embodiments of the present disclosure, other and further embodiments of the disclosure may be devised without departing from the basic scope thereof, and the scope thereof is determined by the claims that follow.

What is claimed is:

1. A same gap verify (SGV) module head assembly, comprising:
   a closure;
   a substrate disposed adjacent to the closure;
   a plurality of write transducer and read transducer pairs disposed between the closure and the substrate at a media facing surface;
   a plurality of write bonding pads disposed adjacent to the closure;
   a plurality of write leads, wherein one or more write bonding pads of the plurality of write bonding pads are coupled to each write transducer via one or more write leads of the plurality of write leads;
   a plurality of read bonding pads disposed adjacent to the plurality of write bonding pads;

a plurality of read leads, wherein one or more read bonding pads of the plurality of read bonding pads are coupled to each read transducer via one or more read leads of the plurality of read leads;

an isolation shield recessed from the media facing surface, the isolation shield being disposed between the write transducer and the read transducer of each pair such that the isolation shield is disposed between the plurality of write leads and the plurality of read leads; and at least one ground bonding pad, wherein the isolation shield is coupled to the at least one ground bonding pad, the closure, and the substrate.

2. The SGV module head assembly of claim 1, wherein the isolation shield comprises Cu, Au, and has a thickness of about 1 µm to about 10 µm.

3. The SGV module head assembly of claim 1, further comprising a plurality of thin film plates disposed at the media facing surface, wherein a thin film plate of the plurality of thin film plates is disposed between the write transducer and the read transducer of each pair.

4. The SGV module head assembly of claim 3, wherein the isolation shield is disposed on each of the plurality of thin film plates.

5. The SGV module head assembly of claim 1, further comprising a conductive material disposed between the media facing surface and the isolation shield.

6. The SGV module head assembly of claim 1, wherein the isolation shield is recessed from the media facing surface a distance of about 2 µm to about 10 µm.

7. The SGV module head assembly of claim 1, wherein the SGV module head assembly is controllable to write data to a media using the write transducer of each pair and to read verify the data using the read transducer of each pair.

8. A tape head comprises the SGV module head assembly of claim 1.

9. A tape drive comprising the tape head of claim 8.

10. The tape drive of claim 9, comprising:
a write driver coupled to each write transducer of the plurality of write transducers through a write circuit; and
a preamp coupled to each read transducer of the plurality of read transducers through a read circuit.

11. The tape drive of claim 10, wherein a cross-talk (CT) of the SGV module head assembly is determined based on an equation of CT=(X/F)*W*R*A*K, where X is an impedance of the isolation shield, F is a parasitic impedance of the write circuit, W is a net impedance misbalance of the write circuit, R is a new impedance misbalance of the read circuit, A is an impedance of the plurality of read transducers and the preamp relative to an impedance of the plurality of read transducers to ground, and K is a fraction of a write voltage transferred to the plurality of write transducers.

12. A tape drive, comprising:
one or more same gap verify (SGV) module head assemblies, each of the one or more SGV module head assemblies comprising:
a closure;
a substrate disposed adjacent to the closure;
a plurality of write transducers disposed between the closure and the substrate at a media facing surface;
a plurality of read transducers disposed between the closure and the substrate at the media facing surface, the plurality of read transducers being disposed adjacent to the plurality of write transducers;
a plurality of write leads, one or more write leads of the plurality of write leads being coupled to each write transducer of the plurality of write transducers and one or more write bonding pads;
a plurality of read leads, one or more read leads of the plurality of read leads being coupled to each read transducer of the plurality of read transducers and one or more read bonding pads;
an isolation shield recessed from the media facing surface, the isolation shield being disposed between the plurality of write transducers and the plurality of read transducers such that the isolation shield is disposed between the plurality of write leads and the plurality of read leads; and
at least one ground bonding pad, wherein the isolation shield is coupled to the at least one ground bonding pad, the closure, and the substrate;
a write driver coupled to each write transducer of the plurality of write transducers through a write circuit; and
a preamp coupled to each read transducer of the plurality of read transducers through a read circuit.

13. The tape drive of claim 12, wherein the isolation shield reduces residual voltage from the write driver from being transferred to the preamp.

14. The tape drive of claim 12, wherein the isolation shield is further coupled to each write transducer of the plurality of write transducers and each read transducer of the plurality of read transducers via one or more capacitors.

15. The tape drive of claim 12, wherein each of the one or more SGV module head assemblies further comprises a plurality of thin film plates disposed between the plurality of write transducers and the plurality of read transducers, and wherein the isolation shield is disposed in contact with the plurality of thin film plates.

16. The tape drive of claim 12, wherein the isolation shield has a length greater than or equal to a length of the plurality of write leads.

17. The tape drive of claim 12, wherein the plurality of write transducers are spaced a distance of about 5 µm to about 20 µm from the plurality of read transducers.

18. The tape drive of claim 12, further comprising a controller, wherein the controller is configured to write data to a media using the plurality of write transducers and to read verify the data using the plurality of read transducers.

19. The tape drive of claim 12, wherein a cross-talk (CT) of the one or more SGV module head assemblies is determined based on an equation of CT=(X/F)*W*R*A*K, where X is an impedance of the isolation shield, F is a parasitic impedance of the write circuit, W is a net impedance misbalance of the write circuit, R is a new impedance misbalance of the read circuit, A is an impedance of the plurality of read transducers and the preamp relative to an impedance of the plurality of read transducers to ground, and K is a fraction of a write voltage transferred to the plurality of write transducers.

20. A tape head, comprising:
a closure;
a substrate disposed adjacent to the closure;
at least one ground bonding pad disposed adjacent to the closure;
a plurality of write bonding pads disposed adjacent to the at least one ground bonding pad;
a plurality of read bonding pads disposed adjacent to the plurality of write bonding pads;
a plurality of write transducer and read transducer pairs disposed between the closure and the substrate at a media facing surface, wherein each write transducer and read transducer pair comprises:

a first write lead and a second write lead, wherein first and second write leads are coupled to the write transducer, a first write bonding pad of the plurality of write bonding pads, and a second write bonding pad of the plurality of write bonding pads; and a first read lead and a second read lead, wherein first and second read leads are coupled to the read transducer, a first read bonding pad of the plurality of read bonding pads, and a second read bonding pad of the plurality of read bonding pads; and an isolation shield recessed from the media facing surface, the isolation shield being coupled to the at least one ground bonding pad, the closure, and the substrate, wherein the isolation shield is disposed between the write transducer and the read transducer of each pair such that the isolation shield is disposed between the first and second write leads and the first and second read leads of each pair.

21. The tape head of claim 20, further comprising a plurality of thin film plates disposed at the media facing surface, wherein a thin film plate of the plurality of thin film plates is disposed between the write transducer and the read transducer of each pair.

22. The tape head of claim 20, wherein the isolation shield is recessed from the media facing surface a distance of about 2 μm to about 10 μm, wherein the isolation shield comprises Cu, and wherein the isolation shield has a thickness of about 2 μm to about 10 μm.

23. The tape head of claim 20, wherein the isolation shield is recessed from the media facing surface between the write transducer and the read transducer of each pair by a conductive material.

24. The tape head of claim 20, wherein the isolation shield has a length greater than or equal to a length of the first and second write leads of each pair.

25. A tape drive comprising the tape head of claim 20.

26. The tape drive of claim 25, further comprising:
a write driver coupled to the write transducer of each pair through a write circuit;
a preamp coupled to the read transducer of each pair through a read circuit; and
a controller, the controller being configured to write data to a media using the write transducer of each pair and to read verify the data using the read transducer of each pair.

27. The tape drive of claim 26, wherein a cross-talk (CT) of the tape head is determined based on an equation of $CT=(X/F)*W*R*A*K$, where X is an impedance of the isolation shield, F is a parasitic impedance of the write circuit, W is a net impedance misbalance of the write circuit, R is a new impedance misbalance of the read circuit, A is an impedance of the plurality of read transducers and the preamp relative to an impedance of the plurality of read transducers to ground, and K is a fraction of a write voltage transferred to the plurality of write transducers.

* * * * *